United States Patent
Isonuma

(10) Patent No.: US 7,433,318 B2
(45) Date of Patent: Oct. 7, 2008

(54) RECEIVED PATH TRACE DETECTION APPARATUS

(75) Inventor: Ritsuko Isonuma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 645 days.

(21) Appl. No.: 11/067,474

(22) Filed: Feb. 25, 2005

(65) Prior Publication Data

US 2005/0174948 A1   Aug. 11, 2005

Related U.S. Application Data

(63) Continuation of application No. PCT/JP02/08683, filed on Aug. 28, 2002.

(51) Int. Cl.
    *G01R 31/08* (2006.01)
(52) U.S. Cl. ................. 370/242; 370/248
(58) Field of Classification Search ............. None
    See application file for complete search history.

(56) References Cited

U.S. PATENT DOCUMENTS

| | | | |
|---|---|---|---|
| 5,570,371 A | * | 10/1996 | Iga .................. 370/476 |
| 5,634,097 A | | 5/1997 | Ashi et al. |
| 6,021,112 A | | 2/2000 | Sugawara |
| 6,226,270 B1 | * | 5/2001 | Chiku et al. .......... 370/248 |

FOREIGN PATENT DOCUMENTS

| | | |
|---|---|---|
| JP | 5-252184 | 9/1993 |
| JP | 7-327021 | 12/1995 |
| JP | 10-23053 | 1/1998 |
| JP | 11-55264 | 2/1999 |
| JP | 11-261513 | 9/1999 |

OTHER PUBLICATIONS

International Search Report dated Nov. 26, 2002.

* cited by examiner

*Primary Examiner*—Chau Nguyen
*Assistant Examiner*—Sori A Aga
(74) *Attorney, Agent, or Firm*—Katten Muchin Rosenman LLP

(57) ABSTRACT

A received path trace detection apparatus includes (i) a specific byte extracting/holding function unit for receiving a path signal and extracting and holding once path information written for showing the path in specific bytes in the received path signal at a predetermined sampling timing, (ii) a comparing function unit for detecting if path information for specific bytes held and path specific bytes currently received match, (iii) a protecting function unit for detecting that the matches have continued for exactly a predetermined number of protection stages as a result of the comparison by the function unit, and (iv) a forwarding function unit for forwarding the held path information to an erroneous connection decision unit for deciding if values exhibited by path information of the specific bytes held at the function unit and predetermined expected values match when matches of the consecutive number of protection stages are detected by the function unit.

19 Claims, 23 Drawing Sheets

FIG.12

DATA CONFIGURATION:

| PROTECTION | COMP | J1 BYTE |
|---|---|---|
| 3 BITS | 1 BIT | 8 BITS |

J1 BYTE: SHOWS RECEIVED J1 BYTE. 8 BITS
COMP BIT: RESULT OF COMPARISON OF J1 BYTES
NO. OF PROTECTION STAGES: SHOWS NUMBER OF CONSECUTIVE DETECTED PROTECTION STAGES. HERE, ASSUMING 5 STAGE PROTECTION, 3-BIT CODE.

FIG.13

ADDRESS CONFIGURATION:

| STS ch NO. | J1 BYTE NO. |
|---|---|
| 4 BITS | 6 BITS |

STS ch NO.: SHOWS CHANNEL NO. OF STS VIRTUAL CHANNEL. HERE, ASSUMING STS-12 AS EXAMPLE, 4-BIT CODE. "0000"=#1, "1011"=#12
J1 BYTE NO.: 6-BIT CODE SHOWING WHAT BYTE OF PATH TRACE SIGNAL J1 BYTE IS.
all "0"=1ST BYTE

| THRESHOLD | GR STANDARD | PRIOR ART STS-1~STS-192c | STS-1 | STS-3c | STS-12c | EXAMPLE 6 OF PRESENT INVENTION STS-24c | STS-48c | STS-96c | STS-192c |
|---|---|---|---|---|---|---|---|---|---|
| $10^{-3}$ | ≤10ms | — | — | — | — | — | — | — | — |
| $10^{-4}$ | ≤100ms | 30ms | 30ms | — | — | — | — | — | — |
| $10^{-5}$ | ≤1s | 300ms | 300ms | 100ms | 25ms | 12.5ms | — | — | — |
| $10^{-6}$ | ≤10s | 3s | 3s | 1s | 250ms | 125ms | 62.5ms | 31.25ms | 16ms |
| $10^{-7}$ | ≤100s | 30s | 30s | 10s | 2.5s | 1.25s | 625ms | 312.5ms | 160ms |
| $10^{-8}$ | ≤1000s | 300s | 300s | 100s | 25s | 12.5s | 6.25s | 3.125s | 1.6s |
| $10^{-9}$ | ≤10000s | 3000s | 3000s | 1000s | 250s | 125s | 62.5s | 31.25s | 16s |

MAX. DETECTION/RELEASE TIME

B3 MIN DETECTION/RELEASE TIME

FIG.22

NUMBER OF B3 MIN DETECTION/RELEASE ERROR BITS

|  | EXAMPLE 6 OF PRESENT INVENTION |
|---|---|
| STS-1~ | DETECTION SIDE:NUMBER OF ERROR BITS$\geq$50, NUMBER OF PROTECTION STAGES=2 |
| STS-192c | RELEASE SIDE:NUMBER OF ERROR BITS$\leq$16, NUMBER OF PROTECTION STAGES=2 |

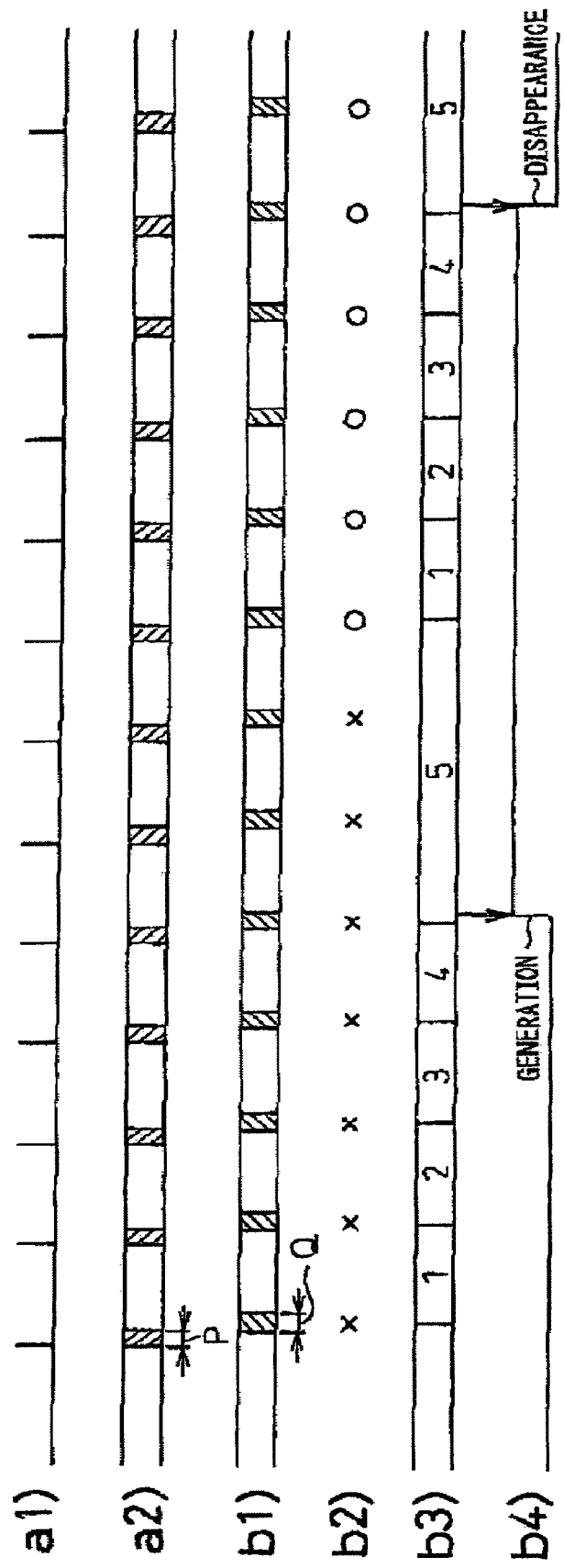

US 7,433,318 B2

RECEIVED PATH TRACE DETECTION APPARATUS

CROSS-REFERENCES TO RELATED APPLICATIONS

This application is a continuation of International Application PCT/JP2002/08683 was filed on Aug. 28, 2002, the contents of which are herein wholly incorporated by reference.

TECHNICAL FIELD

The present invention relates to a received path trace detection apparatus, for example, a received path trace detection apparatus suitable for mounting at an add-drop multiplexer (ADM).

BACKGROUND ART

An ADM terminates a synchronous transport signal (STS) path signal or a virtual tributary (VT) path signal and performs several other important functions. One of these functions is the received path trace detection function.

The received path trace detection function is generally called the "path trace identifier mismatch detection function" and is usually abbreviated as "TIM detection". Note that this abbreviation will be used in the later explanation of the present invention as well.

This TIM is detected when a TIM defect occurs. Here, a "TIM defect" means the state of erroneous path connection (connectivity defect) where a "path terminal equipment (PTE) at a certain network element (NE) ends up being connected to an erroneous far end PTE through the network" due to the network manager (user) mistakenly setting the path when the user sets up the path in the network. This TIM defect is an important alarm (ALM) in the various ALMs issued by an ADM.

Specifically, in the above ADM, a path trace detection apparatus receives a string of a path trace signal (path trace string) continuously sent from the PTE to detects the received path trace, while an associated erroneous connection decision unit (CPU) decides whether "the values exhibited by the string of the path trace signal and the expected values preset by the user mismatch" and issues the above ALM. When this ALM is notified to the user, the user learns that the preset path is erroneously connected and immediately resets to the correct path.

Here, this string of the path trace signal is for example a string of 64 bytes of a signal in a synchronous optical network (SONET) or a string of 16 bytes of a signal in a synchronous digital hierarchy (SDH).

Note that at the present time, the above TIM defect (and TIM failure) is defined only with respect to a STS path layer, but in the future it is expected that it will be defined for a VT path layer as well (with respect to a VT section layer as well). Below, when it is necessary to differentiate between the STS and VT, a TIM defect of the STS path layer will be expressed as "TIM-P" and a TIM defect of the VT path layer will be expressed as "TIM-V".

At the STS path layer, the above string of the path trace signal is a string of J1 bytes (64 bytes' worth), while at the VT path layer, the above string of the path trace signal is a string of J2 bytes. As is well known, a "J1 byte" is a byte mapped in the STS path overhead, while a "J2 byte" is a byte mapped in the VT path overhead.

Note that in the present invention, in addition to the above received path trace detection function, the function of monitoring for bit error included in a path signal for improving the reliability of the ADM will also be alluded to.

After this, as explained in detail with reference to FIG. 23 and FIG. 24, in a received path trace detection apparatus in a conventional ADM, there was the problem that it was not possible to most quickly handle the recent diversification of networks, diversification of types of services, and demands for increasing the number of channels serviced by systems.

Further, there was the problem that the bit error monitoring function in the ADM had to be further improved.

DISCLOSURE OF THE INVENTION

To handle the diversification of networks, the diversification of types of services, and demands for increasing the number of channels serviced by systems, an increase in capacity, a reduction of size, and a reduction of the power consumption of the hardware become essential.

The assignee came up with the idea that for realizing a greater capacity, smaller size, and lower power consumption of hardware, it is important, for the received path trace detection apparatus and the erroneous connection decision unit (CPU) of the ADM, to lighten the processing load of the erroneous connection decision unit (CPU) without enlarging the circuit size of the received path trace detection apparatus. Therefore, the present invention has as its object to provide a received path trace detection apparatus able to reduce the processing load of the CPU.

Further, in addition, it has as its object to provide a bit error monitoring unit able to further improve the reliability at an ADM.

The present invention achieves the above objects by building a comparing means and protecting means comprised of extremely simple hardware into the received path trace detection apparatus and thereby enabling the erroneous connection decision unit (CPU) to simply execute just a step of comparison with the expected values.

Further, it introduces formulas for calculating the probability of error detection considering the drop in the number of error bits due to parity processing in a bit error monitoring unit.

BRIEF DESCRIPTION OF DRAWINGS

FIG. 12 is a view for explaining an example of the data configuration of data (45) input to a memory unit 41 shown in FIG. 11;

FIG. 13 is a view for explaining an example of the address configuration of an address (42) input to a memory unit 41 shown in FIG. 11;

FIG. 22 is a table showing the number of error bits at B3 minor (MIN) detection/release;

FIG. 24 is a time chart of the operation in the ADM shown in FIG. 23.

BEST MODE FOR CARRYING OUT THE INVENTION

To speed understanding of the present invention, first the explanation will be made from the prior art.

Figure 23:
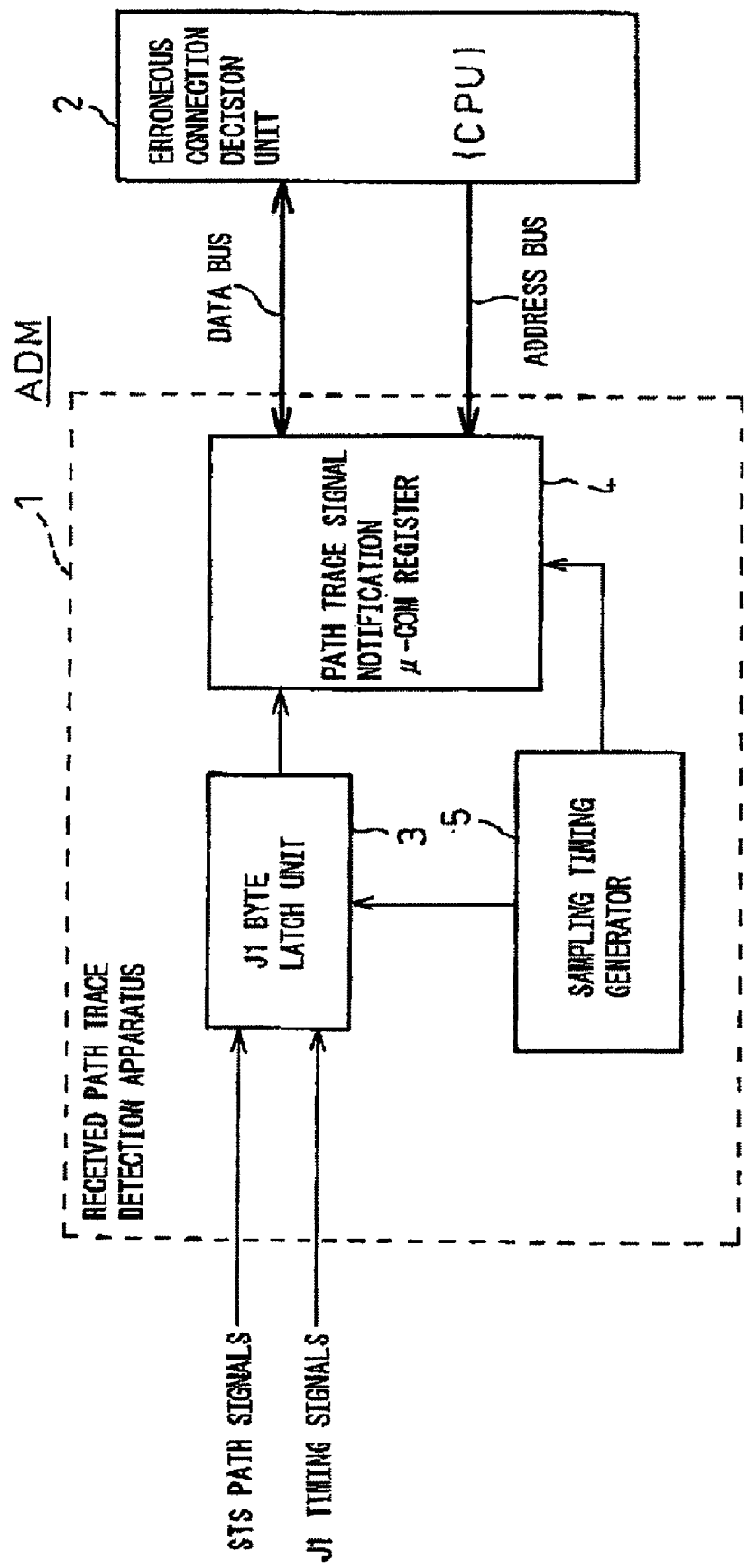
FIG. 23 is a view of an example of a conventional received path trace detection apparatus.

FIG. 23 is a view of an example of a conventional received path trace detection apparatus.

In the figure, reference numeral 1 indicates a received path trace detection apparatus, while 2 indicates an erroneous connection decision unit (CPU). The former is mainly comprised of hardware, while the latter is mainly comprised of software. For example, the above add/drop multiplexer (ADM) to which the present invention is suitably applied has the received path trace-detection apparatus 1 (hereinafter simply referred to also as a "detection apparatus") and erroneous connection decision unit 2 (hereinafter also referred to as a "CPU") as main components.

In the figure, a J1 byte latch unit 3 extracts and latches the J1 bytes forming the string of the STS path trace signal successively from the lead J1 byte from the received STS path signal every period of the J1 timing signal.

A path trace signal notification μ-COM register 4 holds the 64 bytes worth of J1 bytes latched by the J1 byte latch unit 3 as the received string of the path trace signal at the sampling timing from a sampling timing generating unit 5 and notifies it to the CPU 2.

When the received path trace detection apparatus (hardware) 1 finishes collecting the string of the received path trace signal at the sampling timing, the CPU (software) 2 designates the address of the register 4 from an address bus and acquires the collected path trace signal through a data bus.

FIG. 24 is a time chart of the operation in the ADM shown in FIG. 23.

In the figure, a1) and a2) show operations at the received path trace detection apparatus 1 (hardware) side, while b1) to b4) show operations at the erroneous connection decision unit comprised by the CPU 2 (software) side. Specifically, they are as follows:

a1) shows the sampling timing generated by the sampling timing generating unit 5.

a2) shows the operation of collecting the string of the path trace signal at the sampling timing by the J1 byte latch unit 3 and the path trace signal notification μ-COM register 4.

b1) shows the operation of acquiring the string of the path trace signal collected by the CPU 2 by the detection apparatus 1 in synchronization with the above sampling timing.

b2) shows the operation of the CPU 2 comparing the values exhibited by the string of the path trace signal and the above-mentioned expected values preset by the user. Here, the "x" marks indicate when the comparison shows a mismatch, while the "o" marks indicate when it shows a match.

b3) shows a protection operation performed by the CPU 2. In the figure, the CPU 2 judges a "mismatch" for the first time when the "x" continues five times, while judges a "match" for the first time when the "o" continues five times.

b4) shows the generation and disappearance of the alarm (TIM-P) by the CPU 2.

Explaining this in more detail, FIG. 24 is a time chart of conventional TIM-P detection. The period P in the figure is the period for the detection apparatus 1 to perform processing for collecting (extracting and holding) the string of the path trace signal. Further, the period Q in the figure is the period for the CPU 2 to perform processing for picking up the collected path trace signal from the detection apparatus 1 and perform processing for comparing the values of the acquired path trace signal and the above expected values.

For example, when the number of protection stages for TIM-P detection is made "5" as explained above, the CPU 2 detects a TIM-P when the comparison with the expected values shows a mismatch ("x") five consecutive times.

Further, referring to FIG. 23 and FIG. 24, an ADM having the function of terminating the STS path and detecting the already explained TIM-P (STS path trace identifier mismatch) defect/failure detects a TIM-P (b4) of FIG. 34) when the CPU 2 picks up a string of the STS path trace signal (J1 byte group), extracted from the received STS path signal for every sampling timing in the past, in synchronization with the sampling timing (a2) of FIG. 24) (b1) of FIG. 24), performs processing for comparison with the expected values, and detects a mismatch ("x") for the predetermined number of protection stages.

Therefore, the loading processing for the CPU 2 to pick up the received string of the STS path trace signal from the detection apparatus (hardware) 1 has to be performed at every sampling timing. In this case, since the amount of data is also large (64 bytes for each STS channel), the processing load of the CPU 2 ends up becoming extremely large. This is the problem referred to above.

In particular, at the time of occurrence of line error, the processing load of the CPU 2 becomes extremely large due to the ALM processing and PM (preventive maintenance) processing etc. Even at such times, the CPU 2 has to execute the processing for loading the path trace signal at every sampling timing. This causes the problem of the sharp drop in the processing efficiency of the CPU 2.

To solve this problem, the present invention makes the CPU 2 pick up only the STS path trace signal when continuing for the predetermined number of protection stages from the detection apparatus 1. Due to this, it is possible to slash the number of times of load processing of the CPU 2 while leaving the circuit size of the hardware substantially as is and as a result greatly lighten the processing load of the CPU 2 for TIM-P detection processing.

Below, the basic configuration of the present invention and various examples will be explained.

Figure 1:
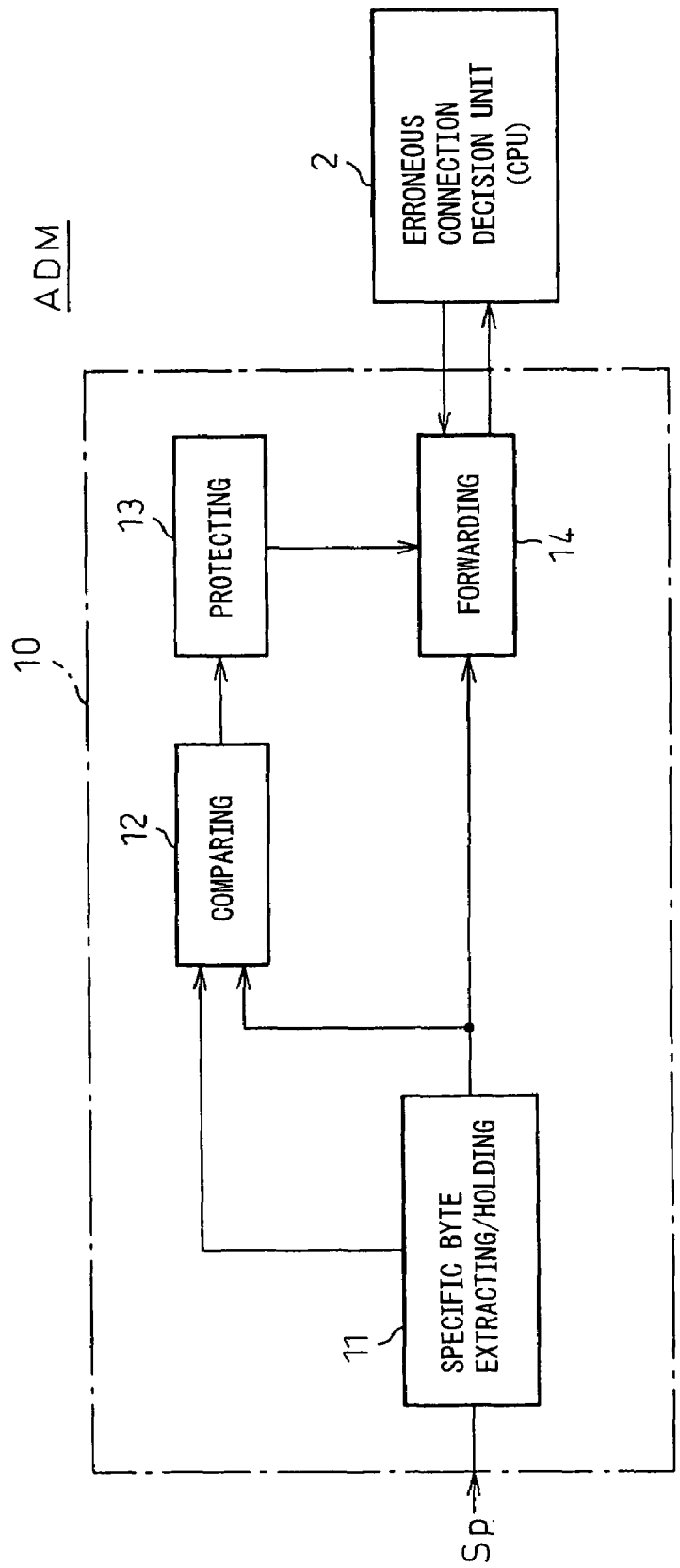
FIG. 1 is a view of the basic configuration of a received path trace detection apparatus according to the present invention.

FIG. 1 is a view of the basic configuration of a received path trace detection apparatus according to the present invention.

The received path trace detection apparatus according to the present invention basically, as illustrated, is comprised of a specific byte extracting/holding means 11, a comparing means 12, a protecting means 13, and a forwarding means 14.

The specific byte extracting/holding means 11 receives the path signal Sp sent from another apparatus (PTE etc.) and extracts and holds once the path information written for showing the path to specific bytes mapped in the received path signal Sp at a predetermined sampling timing.

The comparing means 12 detects if the path information of previous specific bytes held at the specific byte extracting/holding means 11 and the path information of the currently received specific bytes match or not.

The protecting means 13 detects that the matches continue for exactly a predetermined consecutive number of protection stages as a result of a comparison by the comparing means 12.

The forwarding means 14 forwards path information held at the erroneous connection decision unit (CPU) 20 to enable the erroneous connection decision unit (CPU) 20 to decide if the values exhibited by the path information of specific bytes held at the specific byte extracting/holding means 11 and predetermined expected values match when matches of the consecutive number of protection stages are detected by the protecting means 13.

Due to this basic configuration, it becomes possible to achieve the above-mentioned object of the present invention. This will be explained in more detail below.

Figure 2:
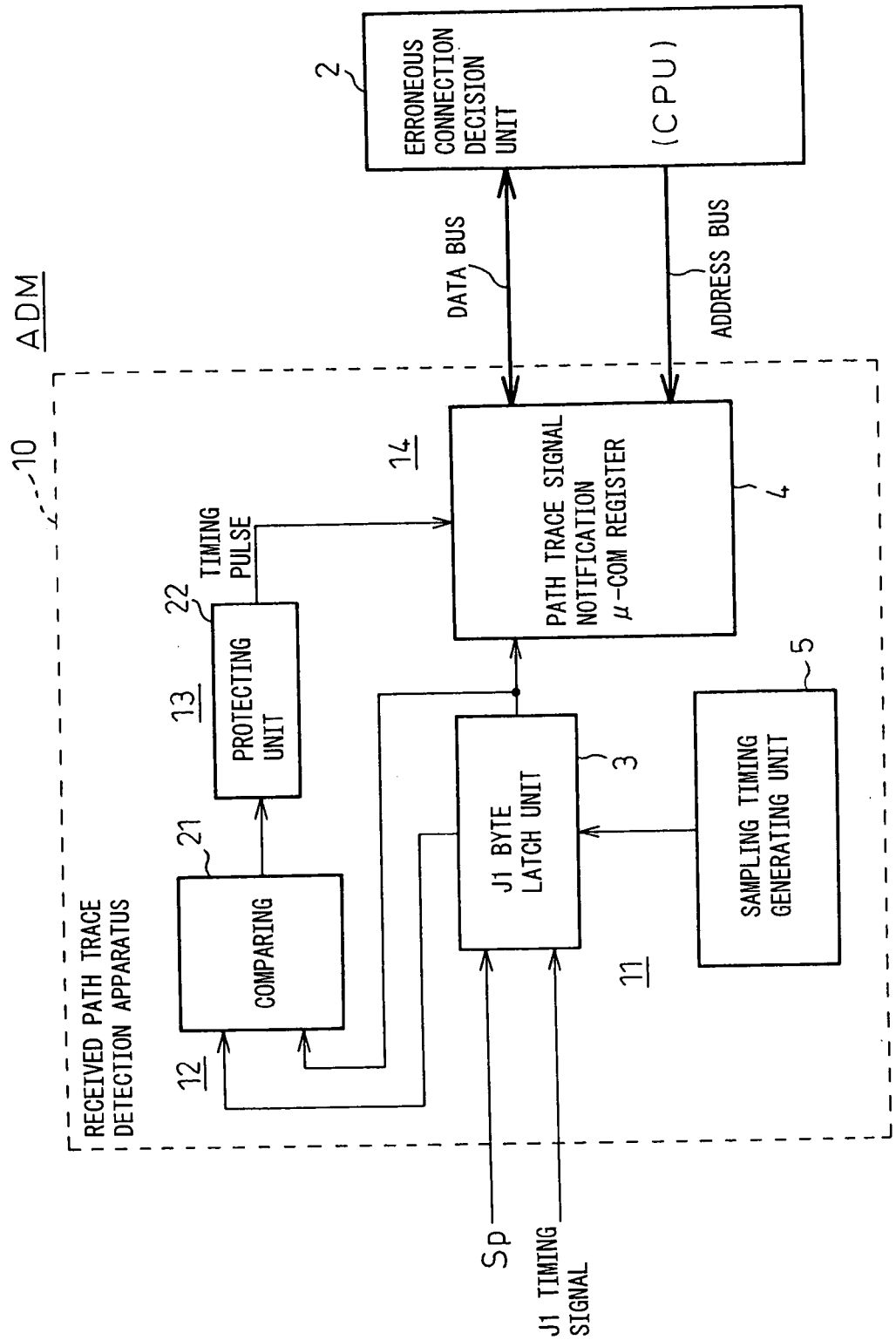
FIG. 2 is a view of Example 1 based on the basic configuration of FIG. 1.
Figure 3:
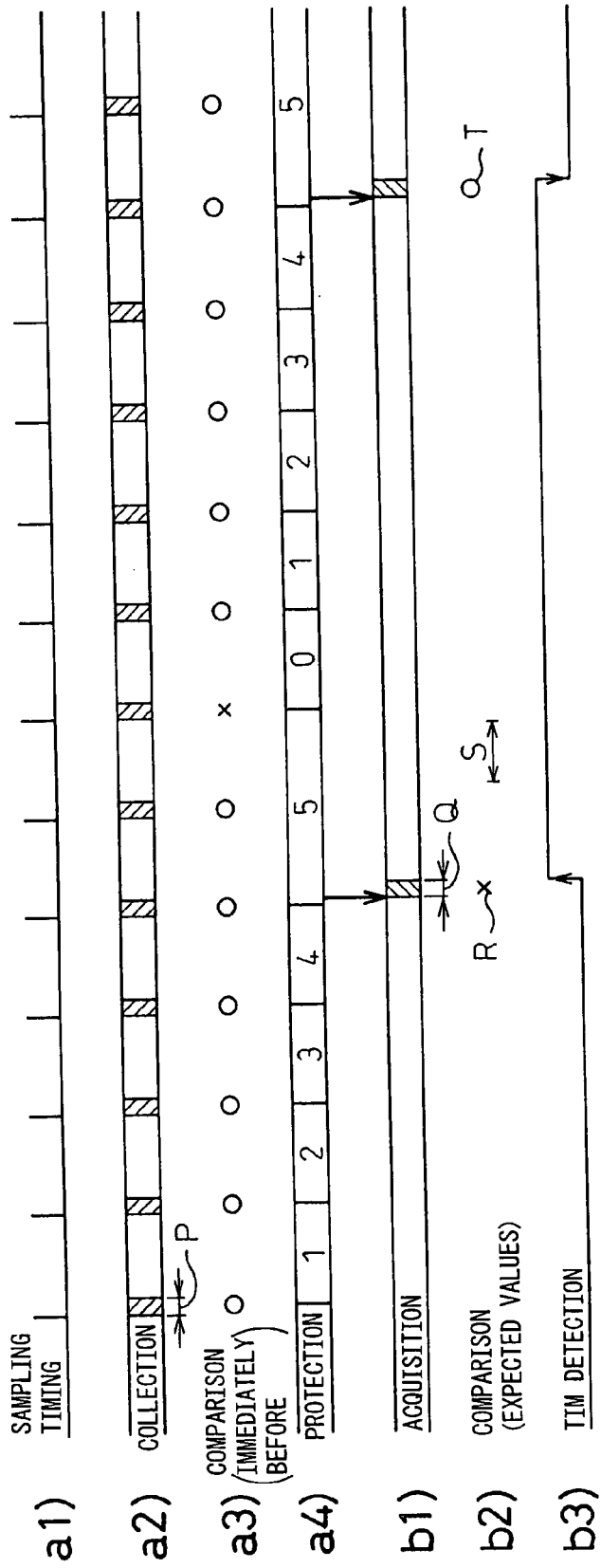
FIG. 3 is a time chart of the operation of Example 1 shown in FIG. 2.

FIG. 2 is a view of Example 1 based on the basic configuration of FIG. 1, while FIG. 3 is a time chart of the operation of Example 1 shown in FIG. 2.

In FIG. 2, the specific byte extracting/holding means 11 shown in FIG. 1 is shown as the pair of the J1 byte latch unit 3 and the sampling timing generating unit 5. The comparing means 12 shown in FIG. 1 is shown as a comparing unit 21, the protecting means 13 shown in FIG. 1 is shown as a protecting unit 22, and the forwarding means 14 shown in FIG. 1 is shown as a path trace signal notification μ-COM register 4. Therefore, in FIG. 2 showing the present invention, the comparing unit 21 and protecting unit 22 are added to the conventional configuration shown in FIG. 23. Below, FIG. 2 will be explained in further detail.

The J1 byte latch unit 3 extracts and latches the J1 bytes forming the string of the STS path trace signal successively from the lead J1 byte from the received STS path signal Sp every sampling timing.

The comparing unit 21 compares the previously sampled corresponding J1 bytes of the path trace signal and the currently extracted J1 bytes. Since it compares one STS path trace signal divided into 64, that is, one byte at a time, a single 8-bit input computer is sufficient for the circuit.

The protecting unit 22 generates a timing pulse for updating the path trace signal notification μ-COM when the comparison by the comparing unit 21 shows a match for exactly the number of protection stages. Since it handles the results of comparison, a single counter for the number of protection stages (if the number of protection stages is "5", a 3-bit counter) is sufficient for the circuit.

The register 4 holds 64 bytes worth of J1 bytes latched by the J1 byte latch unit 3 as the received path trace signal confirmed to continue for exactly the number of protection stages and notifies them to the erroneous connection decision unit (CPU) 2.

The CPU 2 acquires the received path trace signal confirmed to continue for the number of protection stages from the data bus by designating the address of the register 4 from the address bus every period of the TIM-P detection time.

Next, referring to FIG. 3, the time chart of the figure resembles the time chart of the above-mentioned FIG. 24 (prior art), but the role played by the received path trace detection apparatus 10 of the present invention shown in a1) to a4) of FIG. 3 and the role played by the erroneous connection decision unit (CPU) 2 of the present invention shown in b1) to b3) of FIG. 3 differ from the roles played by the detection apparatus 1 and CPU 2 shown in FIG. 24.

That is, the period P of FIG. 3 in the present invention is the period during which the detection apparatus 10 (hardware) performs processing for collecting (extracting and holding) the received path trace signal and performs processing for comparing the currently collected 64 bytes of the path trace signal and the previously sampled 64 bytes of the path trace signal.

On the other hand, the period Q of FIG. 3 is the period during which the CPU 2 performs processing for picking up 64 bytes of the received path trace signal passing the number of protection stages from the hardware 10 and performs the processing for comparing the values exhibited by the path information of the path trace signal picked up and acquired (64 bytes) and the predetermined expected values. For example, when the number of protection stages for TIM-P detection is "5", the detection apparatus (hardware) 10 updates the values of the path information in the register 4 when the comparison with the previously sampled path trace signals shows a match five consecutive times. The CPU 2 compares the values exhibited by the path information of the acquired and updated path trace signal and the expected values and detects a TIM-P (alarm) when the comparison shows a mismatch ("x"). This is the "x" shown by R in b2) of FIG. 3.

Here, the already explained network manager (user) receiving the notification of the alarm learns that there is an error in the connection of the path currently set and resets to the correct desired path. The period of resetting of the path is shown as S in b2) of FIG. 3. After this, the hardware 10 continues the processing of a1) to a4) in the same way, but since this time the correct path has been reset to, the value of the path information after the number of protection stages matches with the above expected values ("o"). This match is the "o" shown by T in b2) of FIG. 3.

As explained above, in the present invention shown in FIG. 1 to FIG. 3, by realizing the monitoring of the continuity of the path information of the sampled received STS path trace signal (that is, the J1 bytes) by substantially the conventional circuit size and having the CPU 2 pick up only the STS path trace signal continuing for the predetermined number of protection stages from the hardware 10, it is possible to extend the period of the loading processing of the CPU 2 from the period of the sampling timing (conventional) to the period of the consecutive number of protection stages while the circuit size of the hardware 10 remains substantially the same. Due to this, it becomes possible to cut the number of times of loading by the CPU 2 to for example ⅕ of the past and greatly lighten the processing load of the CPU 2 required for the TIM-P detection processing, that is, the decision of erroneous connection.

In particular, the present invention exhibits the greatest effect when a line error occurs where the processing load of the CPU 2 peaks. At the time of occurrence of line error, it is assumed that the state of discontinuity of the STS path trace signal will continue. Slashing the load processing from the period of sampling timing to the period of a consecutive number of protection stages greatly contributes to a great reduction of the processing load of the CPU 2. In this way, it is possible to leave the circuit size of the hardware 10 substantially as it is and slash the load processing at the time when the processing load of the CPU 2 peaks to greatly improve the efficiency of processing of the CPU.

Next, Example 2 of the present invention will be explained.

Figure 4:
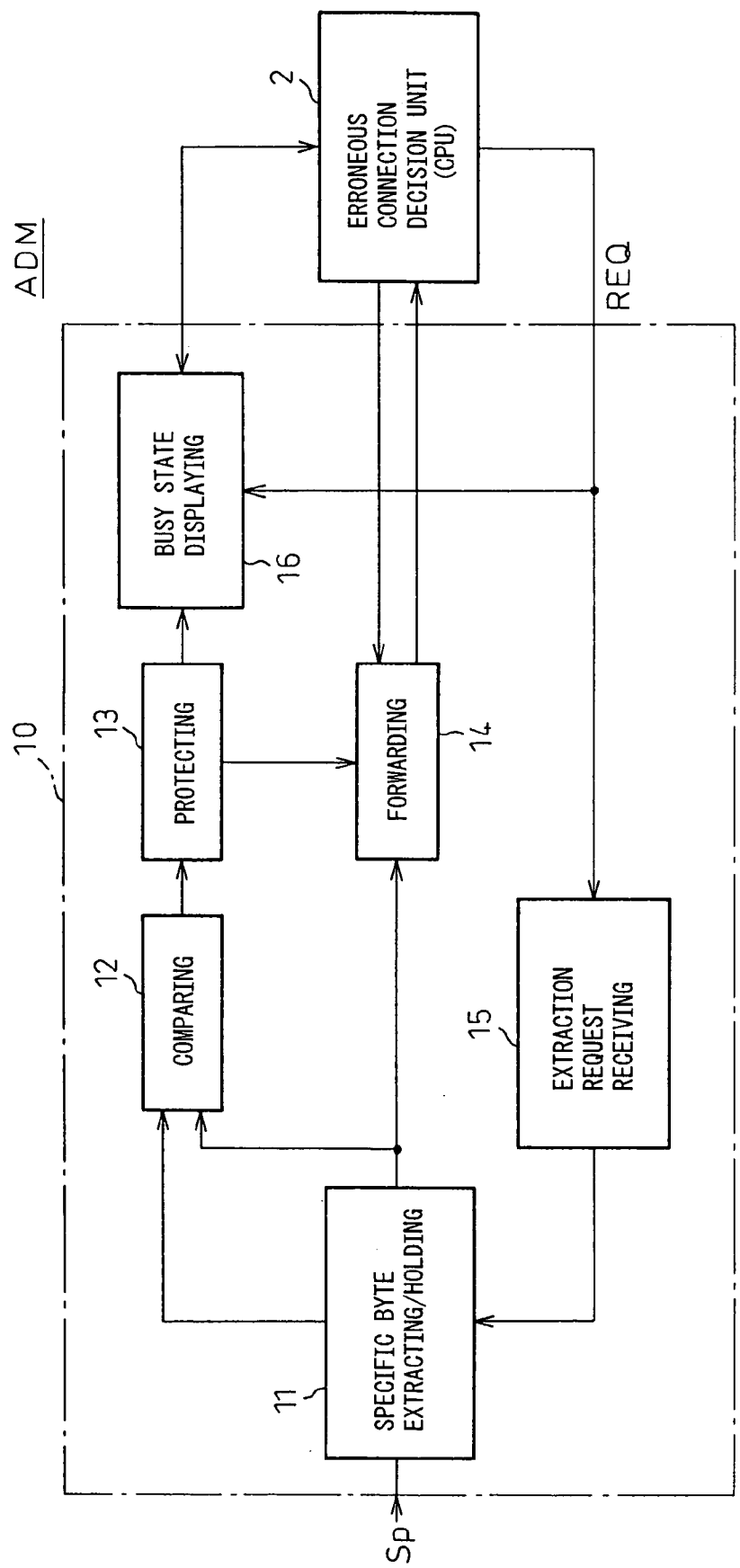
FIG. 4 is a view of the basic configuration of Example 2 according to the present invention.

FIG. 4 is a view of the basic configuration of Example 2 according to the present invention.

The received path trace detection apparatus (hardware) 10 according to Example 2 is, as illustrated in FIG. 4, newly provided with an extraction request receiving means 15 and a busy state displaying means 16.

The extraction request receiving means 15 receives an extraction request REQ for starting up the specific byte extracting/holding means 11 from the erroneous connection decision unit (CPU) 2 as the above-mentioned sampling timing.

The busy state displaying means 16 is set and displays a busy state when the extraction request receiving means 15 receives the extraction request REQ and is reset and releases the busy state when the protecting means 13 detects a match for the consecutive number of protection stages explained above.

Here, the erroneous connection decision unit (CPU) 2 confirms that the busy state displaying means 16 has been reset and reads the path information of the specific bytes (64 bytes of J1 bytes) from the forwarding means 14.

Figure 5:
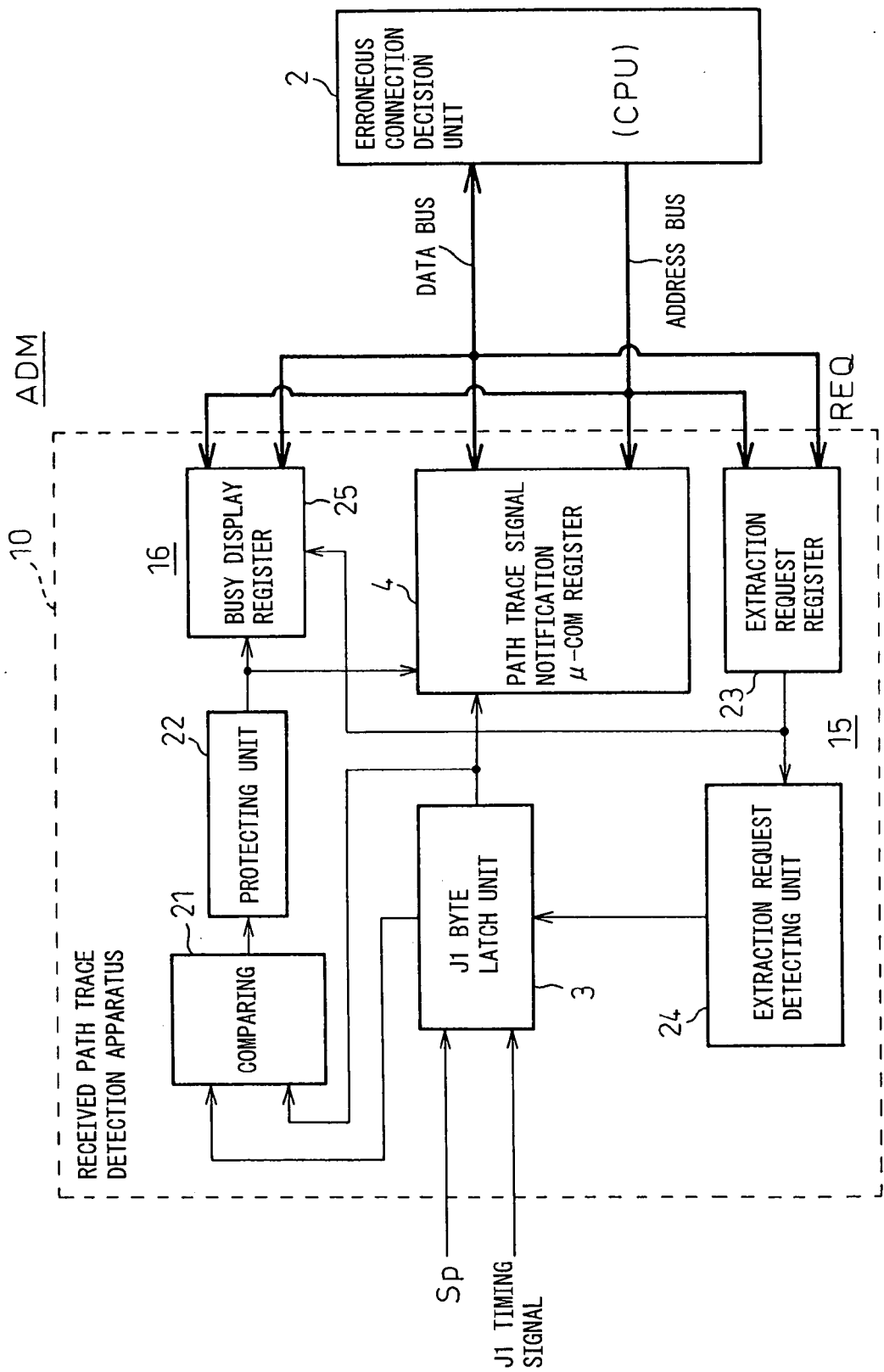
FIG. 5 is a view of Example 2 based on the basic configuration of FIG. 4.
Figure 6:
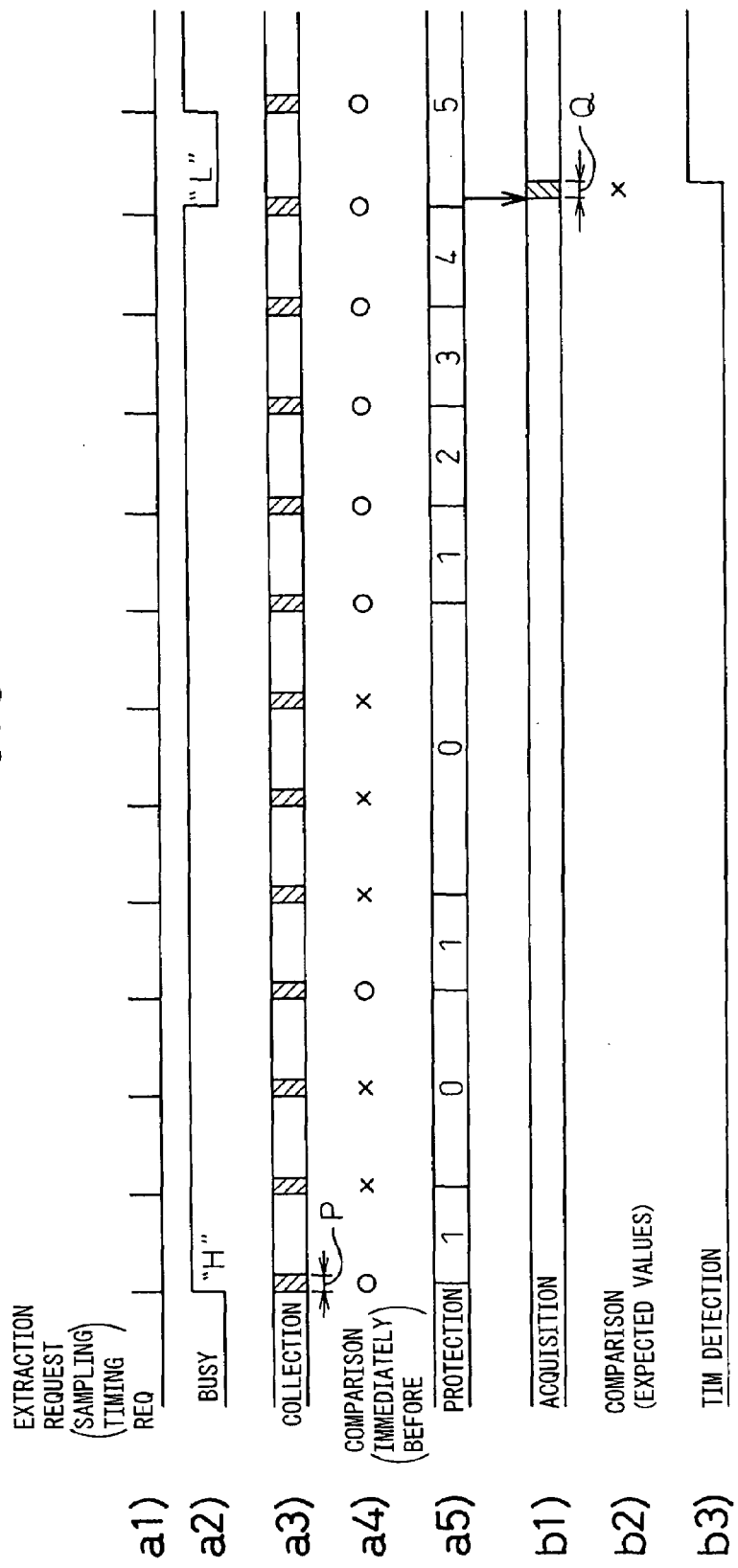
FIG. 6 is a time chart of the operation of Example 2 shown in FIG. 5.

FIG. 5 is a view of Example 2 based on the basic configuration of FIG. 4, while FIG. 6 is a time chart of the operation of Example 2 shown in FIG. 5.

In FIG. 5, the extraction request receiving means 15 shown in FIG. 4 is shown as the pair of an extraction request register 23 and an extraction request detecting unit 24, while the busy state displaying means 16 shown in FIG. 4 is shown as a busy display register 25. Comparing with FIG. 2, in FIG. 5, instead of the sampling timing generating unit 5 of FIG. 2, an extraction request register 23, extraction request detecting unit 24, and busy display register 25 are newly introduced.

Here, the erroneous connection decision unit (CPU) 2 predicts in advance the time required for detecting matches of the consecutive number of protection stages and confirms that the busy state displaying means 16, that is, the busy display register 25, has been reset at the predicted timing.

Below, FIG. 5 will be explained in further detail.

The extraction request register 23 is a 1-bit register for enabling the erroneous connection decision unit (CPU) 2 to set an extraction request for the STS path trace signal every sampling timing.

On the other hand, the busy display register 25 is a 1-bit register which notifies the CPU 2 of the state of the path trace signal notification μ-COM register 4 not being able to be accessed (busy state) when triggered by the extraction request REQ from the CPU 2 first set after the busy state has been released and notifies the CPU 2 that the busy state has been released and that path information can be read from the register 4 when the path trace signal extracted from the J1 byte latch unit 3 continues for exactly a predetermined number of protection stages.

The CPU 2 performs processing for viewing the bits of the busy display register 25 for example after 16 ms after the issuance of the extraction request REQ at the sampling timing. This 16 ms is the maximum time required for the received path trace detection apparatus (hardware) 10 to decide whether to lift the busy state. That is, the hardware 10 requires a maximum of 16 ms (=64 bytes×125 μs×2) of time from starting a search of the last frame (LF) code triggered by the extraction request REQ until writing the string of the received path trace signal (64 bytes worth of J1 bytes) having the next J1 byte after detection of the LF code (maximum 8 ms) as a lead byte in the register 4 (fixed at 8 ms).

Further, only when the CPU 2 confirms that the busy state has been released, the CPU 2 designates the address of the register 4 from the address bus and acquires the received path trace signal continuing for exactly the number of protection stages from the data bus.

Next, referring to the time chart of FIG. 6, the explanations of the period P and period Q in the figure are the same as those in FIG. 3 explained above.

The busy information of a2) of the figure becomes "H" (busy state) by the extraction request REQ from the CPU 2 shown in a1) in the figure first set after the busy state has been released and becomes "L" (busy state released) right after the request continues for the number of protection stages.

The CPU 2 detects the release of the busy state with a small time lag and acquires the data of the path trace signal (path information). For example, when the number of protection stages of detection of a TIM-P is "5", the hardware 10 releases the busy state only when the results of comparison with the previously sampled path information (64 bytes worth of J1 bytes) match continuously five times and acquires the path information only when the CPU 2 confirms the release of the busy state.

In Example 2 of the present invention, the hardware 10 extracts the received STS path trace signals when triggered by the extraction request REQ of the STS path trace signal set at each sampling timing by the CPU 2 and realizes processing for notifying the CPU 2 that the path information can be forwarded from the register 4 by substantially the conventional circuit size only when this continues for a predetermined number of protection stages. By the CPU 2 starting to pick up the data from the register 4 (path information) based on the information showing that forwarding is possible, the CPU 2 can predict the timing of decision of the possibility of forwarding the path information by the hardware 10 with the circuit size of the hardware 10 as is. The CPU 2 can pick up only the STS path trace signal continuing for the number of protection stages by just performing the processing for reading the bits showing the possibility of forwarding from the register 25 the minimum necessary number of times.

As explained above, in Example 2, the CPU 2 manages the sampling timing by the hardware 10. Further, the CPU 2 predicts the timing for the hardware 10 to decide the possibility of forwarding the path information by monitoring the continuity. Due to this, it is possible to read the forwardable information efficiently. Due to this, it is possible to timely forward data (path information) of only the STS path trace signal continuing for the number of protection stages and possible to realize this by a lightened CPU processing load.

Next, Example 3 of the present invention will be explained.

Figure 7:
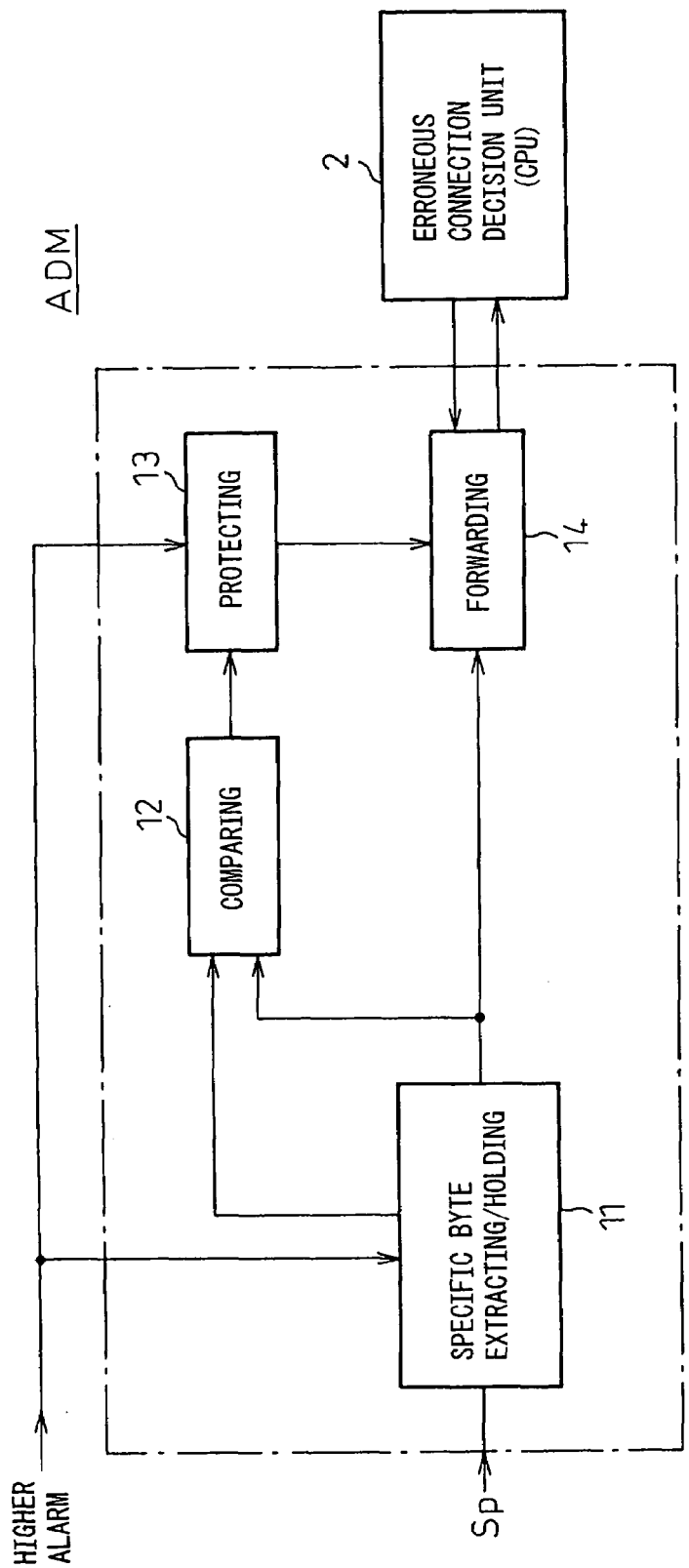
FIG. 7 is a view of the basic configuration of Example 3 according to the present invention.

FIG. 7 is a view of the basic configuration of Example 3 according to the present invention. This figure is based on the basic configuration shown in FIG. 1, but may also be based on the basic configuration shown in FIG. 4.

Example 3:

(1) supplies alarm information to the protecting means 13 when a higher alarm has been detected and thereby invalidates the results of detection of whether or not the path information of specific bytes match as input from the comparing means 12 to the protecting means 13 and holds as is the number of protection stages accumulated up to then or (2) supplies alarm information to the specific byte extracting/holding means 11 when a higher alarm has been detected and thereby holds as is, without updating, the path information of the specific bytes held at the specific byte extracting/holding means 11.

Figure 8:
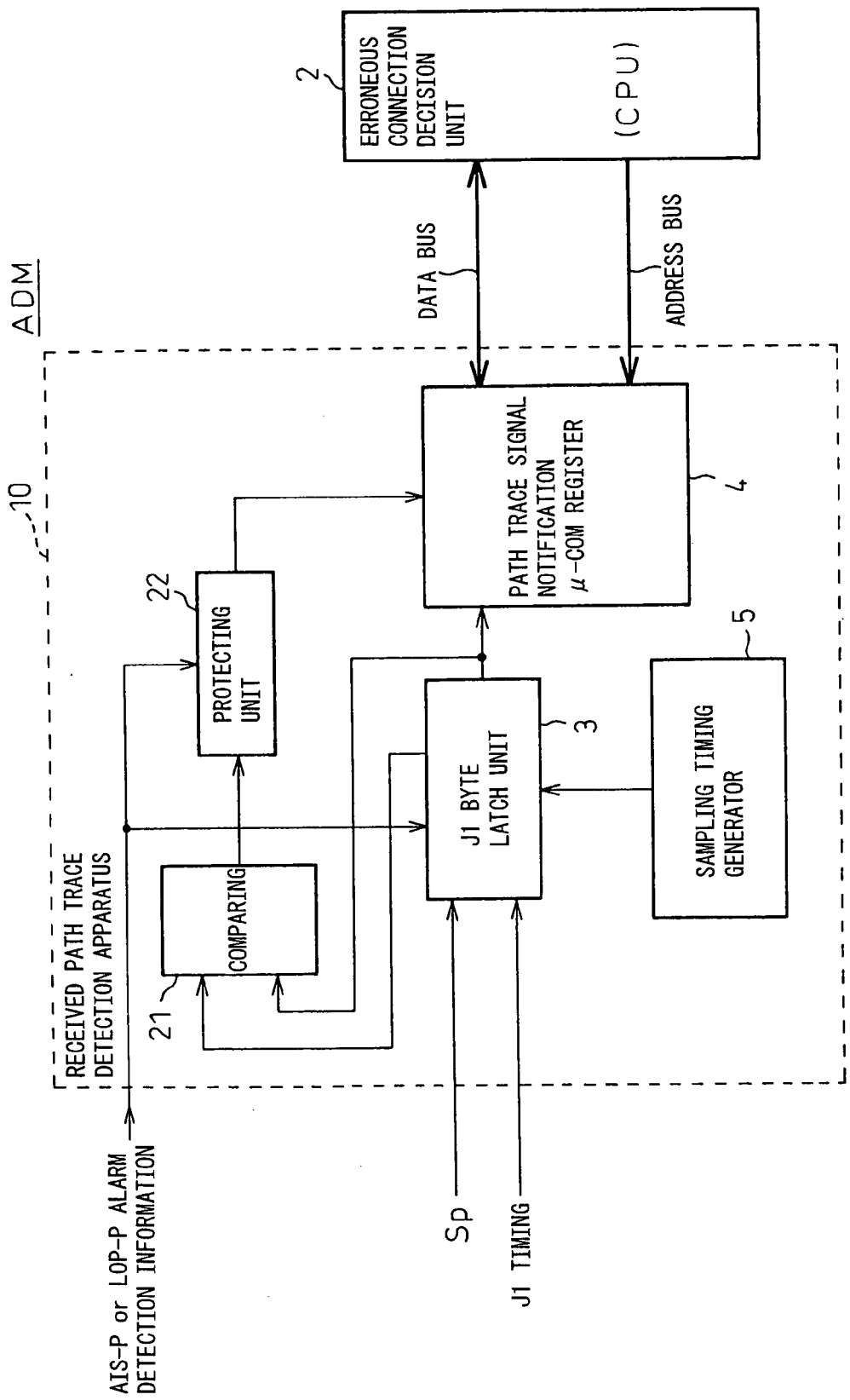
FIG. 8 is a view of Example 3 based on the basic configuration of FIG. 7.
Figure 9:
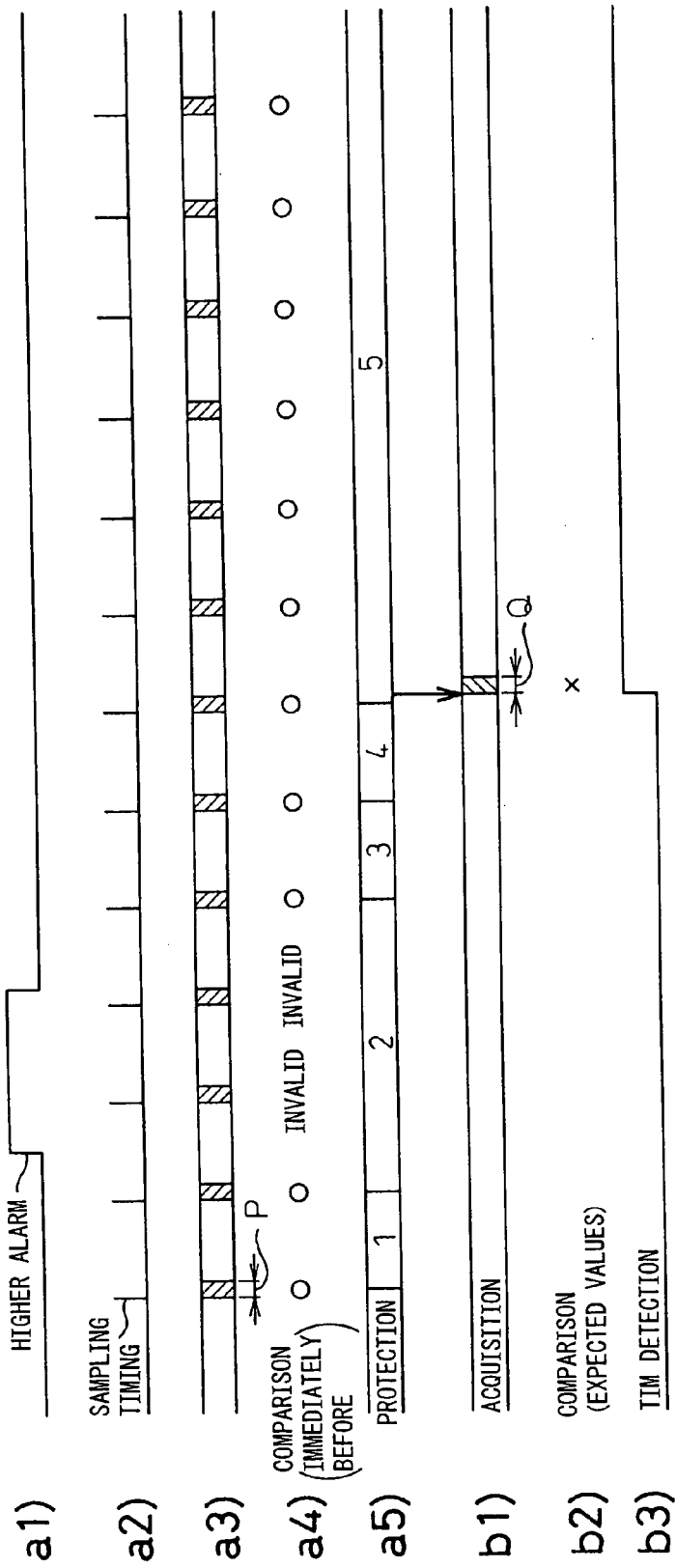
FIG. 9 is a time chart of the operation of Example 3 shown in FIG. 8.

FIG. 8 is a view of Example 3 based on the basic configuration of FIG. 7, while FIG. 9 is a time chart of the operation of Example 3 shown in FIG. 8.

In FIG. 8, the above-mentioned higher alarm is shown as the "AIS-P or LOP-P alarm detection information" at the top left of the figure. "AIS" indicates the "alarm indication signal", while "LOP" indicates "loss of pointer". AIS-P or LOP-P alarm detection is an essential function in an ADM performing STS path termination processing. Therefore, this AIS-P or LOP-P alarm detection information originally exists even in the detection apparatus 10.

The protecting unit 22 treats the results of comparison using the received path trace signal comprised of the J1 bytes sampled during detection of the higher alarm as invalid when receiving the AIS-P or LOP-P alarm detection information. Further, at this time, the consecutive number of protection stages held is the number of stages immediately before.

Further, triggered by the detection of the higher alarm, the unit prohibits the updating of the data held in the J1 byte latch unit 3 (held data of previously sampled J1 bytes) by the subsequently extracted J1 bytes (up to 64th J1 byte).

Next, referring to the time chart of FIG. 9, during detection of the higher alarm (a1), it treats the sampled (a2) path trace signal (a3) as invalid (a4).

In Example 3, triggered by detection of a higher alarm (AIS-P or LOP-P) of the TIM-P, the unit treats the received path trace signal comprised of the J1 bytes sampled during detection of the higher alarm as invalid so as not to affect the monitoring of the continuity in the protecting unit 22. At the same time, triggered by detection of a higher alarm, it prohibits updating of the data held at the J1 byte latch unit 2 (held data of previously sampled J1 bytes) by the subsequently extracted J1 bytes (up to 64th J1 byte). The above processing is realized by substantially the conventional circuit size. Therefore, it is possible to eliminate the processing for monitoring the state of detection of the higher alarm and the processing for deciding the validity of the received STS path trace signal and lighten the processing load of the CPU for processing for detecting the TIM-P.

Further, when a path information extraction request (REQ) of the STS path trace signal is set from the CPU 2 during detection of a higher alarm (see basic configuration of FIG. 4), it becomes possible to compare the received STS path trace signal extracted by the first extraction request after the higher alarm has been dealt with and the normal path trace signal extracted by the extraction request (REQ) before generation of the higher alarm (match/mismatch), so it becomes possible to use the number of protection stages before occurrence of the higher alarm to detect the TIM-P in a shorter time and realize quick easing of traffic due to the same.

Explaining this supplementarily in more detail, the following can be said.

In the ADM or other STS path termination apparatus, if the J1 bytes received during detection of a higher alarm (AIS-P or LOP-P) of the TIM-P from the input path signal are not normal J1 bytes, they may not be used for the received STS path trace signal to be sampled for TIM-P detection.

To apply this standard, in the past, the practice had been to perform processing to monitor the state of detection of a higher alarm (AIS-P or LOP-P) of the TIM-P and decide the validity or invalidity of extracted received STS path trace signal during extraction of the received path trace signal by the path trace detection apparatus (hardware) 1. Therefore, the processing load of the CPU for protection for TIM-P detection ends up becoming heavier.

Further, recognition of the higher alarm state in the CPU 2 is slower than detection and recognition of this by hardware (1), so when a change in the state of the higher alarm occurs near the J1 byte extraction timing, a path trace signal which should be invalidated ends up being treated as valid, while conversely a path trace signal which should be validated ends up being invalidated in some cases. Therefore, there was also the problem that detection of the TIM-P ends up being delayed by the amount of the period of the sampling timing and easing of traffic becomes slower. In Example 3, it is possible to solve this problem and detect the TIM-P in real time.

Figure 10:
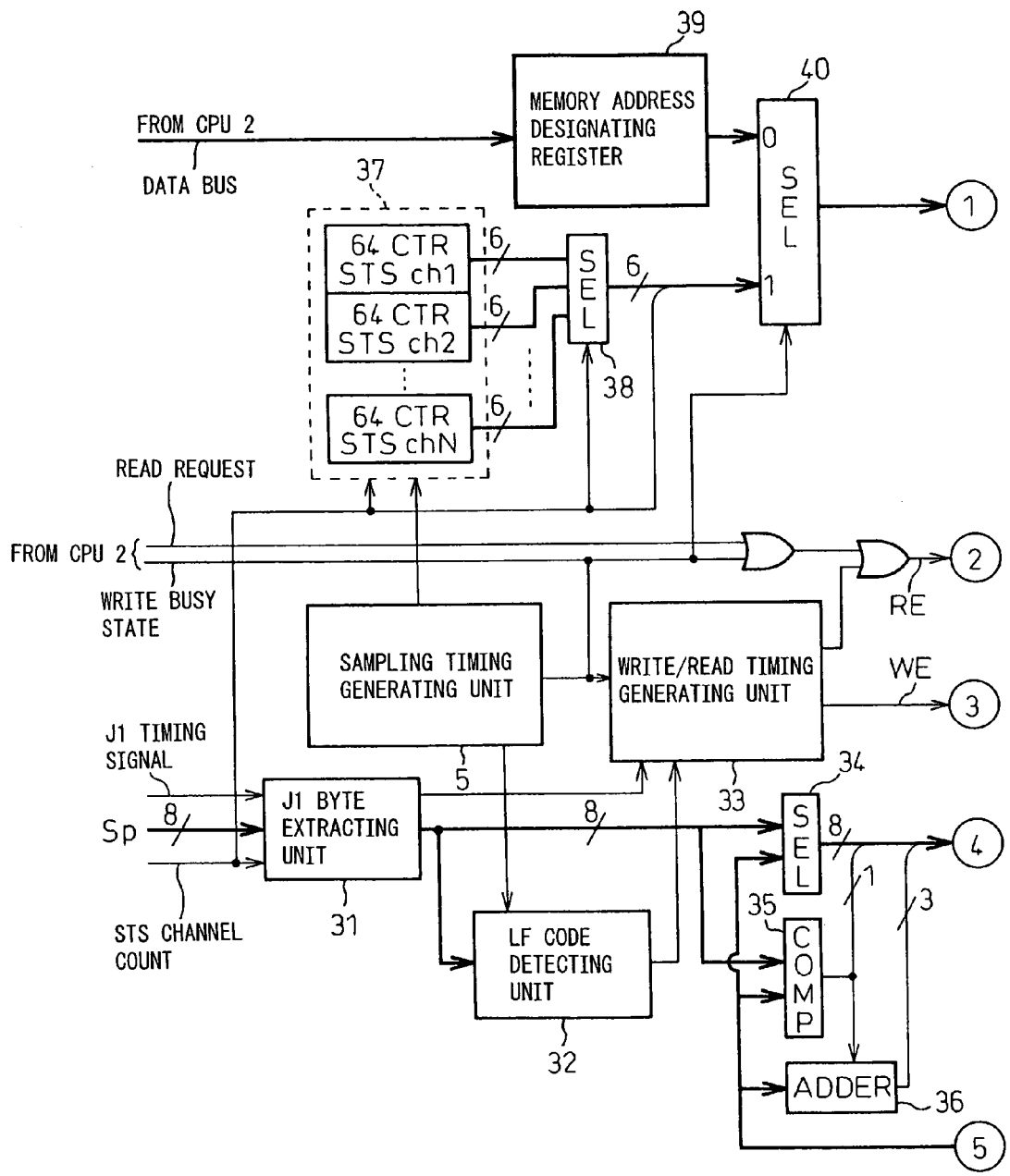
FIG. 10 is a view of the basic configuration of Example 4 according to the present invention (part 1)
Figure 11:
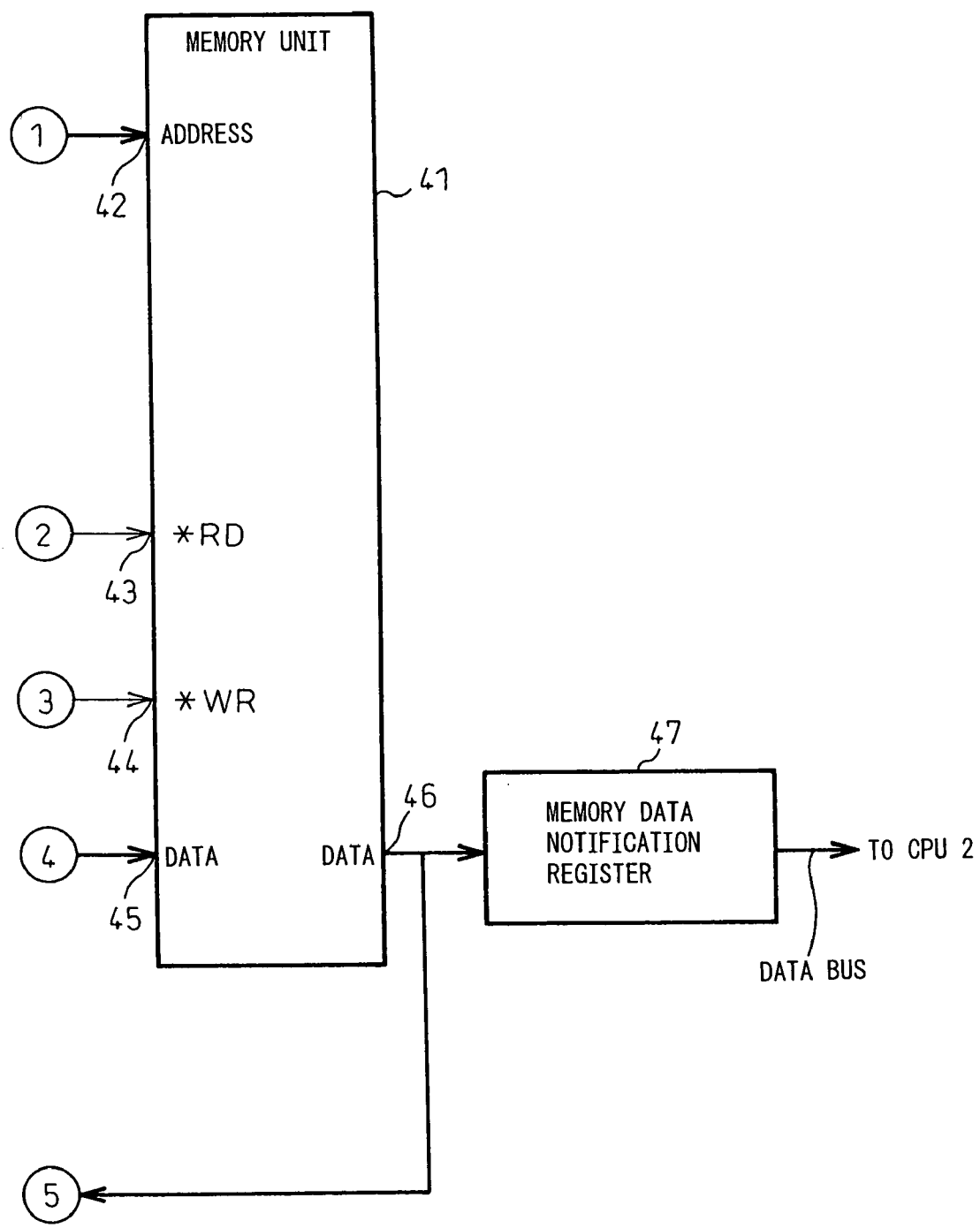
FIG. 11 is a view of the basic configuration of Example 4 according to the present invention (part 2)

FIG. 10 is part 1 of a view of the basic configuration of Example 4 according to the present invention, FIG. 11 is part 2 of the same, FIG. 12 is a view for explaining an example of the data configuration of data (45) input to a memory unit 41 shown in FIG. 11, and FIG. 13 is a view for explaining an example of the address configuration of an address (42) input to a memory unit 41 shown in FIG. 11.

First, the essential configurations in FIG. 10 and FIG. 11 will be summarized below:

1) A holding function of the specific byte extracting/holding means 11 and a forwarding function of the forwarding means are realized by a readable/writeable memory unit (RAM) 41.

2) An extraction function of the specific byte extracting/holding means 11 is realized by a specific byte extracting unit (in the figure, the J1 byte extracting unit) 31, while path information of the specific bytes extracted by the specific byte extracting unit 31 is input to a data write port 45 of the memory unit 41.

3) The comparing means is comprised by a comparator (COMP) 35. Further, path information of specific bytes extracted the previous time and written in the memory unit 41 by the specific byte extracting unit 31 is read out from that memory unit 41 and compared by the comparator 35 with path information of the specific bytes extracted the current time from the specific byte extracting unit 31.

4) The memory unit 41 has a write enable port 44 and a read enable port 43 for enabling writing of path information of the specific bytes to the memory unit 41 and reading of path information of the specific bytes from the memory unit 41 and is further provided with a write/read timing generating unit 33 for supplying a write enable signal WE and read enable signal RE to the write enable port 44 and read enable port 43.

5) The protecting means 13 is configured by an adder 36. Further, it reads out the consecutive number of protection stages written in the memory unit 41, increments the consecutive number of protection stages by the adder 36 based on output of the comparator 35, and again writes the incremented consecutive number of protection stages in the memory unit 41.

6) The memory unit 41 has an address input port 42 for designating an address of data to be written from a data input port 45 of the memory unit 41 and an address of data to be read out from the memory unit 41 to the erroneous connection decision unit (CPU) 2.

Below, the configurations of FIG. 10 and FIG. 11 and the operation thereof will be explained in further detail.

For the address configuration and data configuration of the memory unit 41 storing the received path trace signal (see FIG. 12 and FIG. 13), the configuration of the case of serial processing of the STS-12 signal (STS-1×12) is shown as one example. This memory unit 41 stores the received path trace signal extracted from the input STS path signal Sp by the J1 byte extracting unit 31.

The write/read timing generating unit 33 generates a write and read enable signal (WE, RE) to the memory unit 41.

On the other hand, the 64 counter 37 of each STS path is for recognizing in STS path units which byte of data of the path trace signal the write data to the input port 45 is so as to generate the memory address (42) when writing the path trace signal in the memory unit 41 in J1 byte units. Which STS path it is, is recognized by the STS channel count. The corresponding STS channel is selected by the selector 38.

The detection apparatus (hardware) 10 starts the search of an LF code in the received J1 bytes in the LF code detecting unit 32 when triggered by the sampling timing from the sampling timing generating unit 5. Note that the "LF code" is an 8-bit code designated as the final byte in the 64 bytes of the path trace signal. In the GR-253 CORE standard, the "$OA_H$" code is designated.

The hardware 10 starts the search of the LF code, notifies the busy state to the CPU 2, and masks the access from the CPU 2 to the memory unit 41 in a hardware like manner. The LF code detecting unit 32 detects the LF code, then decides that the J1 byte in the next frame is a lead byte of the STS path trace signal.

The comparator (COMP) 35 compares the thus extracted J1 byte (for example, the 1st byte of STS-1 ch#1) and the previous J1 byte read from the memory unit 41 (for example, the 1st byte of the STS-1 ch#1). When the result of the comparison is that the two do not match, the data in the memory unit 41 (corresponding J1 byte (for example, the 1st byte of the STS-1 ch#1)) is updated.

Further, to transmit the results of mismatch from the 1st byte to the 63rd byte up to the 64th byte, the memory unit 41 holds as data not only the J1 bytes, but also COMP bits showing the results of match/mismatch of the J1 bytes. For example, when the COMP bits are made to "show the results of comparison of match/mismatch from the 1st byte to the J1 byte 1 byte before each byte," the comparator (COMP) 35 performs the comparison. In the case of a mismatch, it updates the data of the J1 byte, designates the address of the next J1 byte (for example address of 2nd byte of STS-1 ch#1), and writes "mismatch" in the COMP bit. Even when the comparison at the comparator (COMP) 35 detects a match, if the COMP bit at the same address shows "mismatch", this shows that there was detection of a mismatch at the previous J1 byte, so the address of the next J1 byte is designated and "mismatch" is written in the COMP bit. In this way, the results of mismatch of the J1 bytes are transmitted up to the 64th byte. As the method of transmitting the results of mismatch, it is possible to apply the above-mentioned method of setting the COMP bits to "show the results of comparison of match/mismatch from the 1st byte to the J1 byte 1 byte before each byte", for example, set the COMP bits to "show the results of comparison of match/mismatch from the 1st byte to the current J1 byte" and, when comparing the J1 bytes, first read out the COMP bit from the address of one byte before of the memory unit 41, then read out the J1 byte from the current address and write the results of comparison in the current address simultaneously with the new J1 byte.

Further, the memory unit 41 also holds code bits showing the number of protection stages of detection of matches as data (FIG. 12). The adder 36 increments by "1" the previous number of protection stages read out from the address of the 64th byte of the memory unit 41 and rewrites the result in the memory unit 41 only when all of the 64 bytes match as a result of the comparison for a match/mismatch up to the 64th byte.

Further, when the search for the LF code at the LF code detecting unit 32 fails to detect any LF code even when searching through 64 received J1 bytes (that is, 64 STS frames worth), it treats this case as a mismatch by clearing the protection stage number code of the address of the 64th byte of the memory unit 41 (for example, forcibly writes "0" in the protection stage number bit) and restarts new monitoring of the continuity of the J1 bytes from the next sampling timing.

In this way, the hardware 10 monitors for continuity of the STS path trace signal. When detecting continuity of the J1 bytes for exactly the number of protection stages determined in advance, it notifies the CPU 2 of release of the busy state. Due to this, it enables the CPU 2 to read out the data stored in the memory unit 41. The CPU 2 confirms that the busy state is released, then starts the read access of the received path trace signal to the memory unit 41. This read operation is performed to the memory unit 41 using the address designation register 39 and memory data notification register 47. The register 47 is for example an FF. Further, the output of the register 39 is selected by a selector 40 when not the write busy state.

In Example 4, the hardware 10 monitors the continuity of the received path trace signal by using a RAM (memory unit 41) as a medium for storing the path trace signal and giving the RAM the role of forwarding data to the CPU 2 so as to enable monitoring of the continuity of J1 bytes by a small sized circuit. In particular, when processing the received path trace signal by serial processing for a plurality of STS channels, by adding flag bits showing the results of comparison of matches of the J1 bytes (COMP bit of FIG. 12) and code bits showing the numbers of protection stages of detection of matches (3 bits of FIG. 12) as the stored data of the RAM for holding the path trace signal (memory 41), the comparator 35 and the adder 36 serving as the protecting unit 22 can be shared by the STS channels and the continuity of the J1 bytes can be monitored by small-sized circuits.

Figure 14:
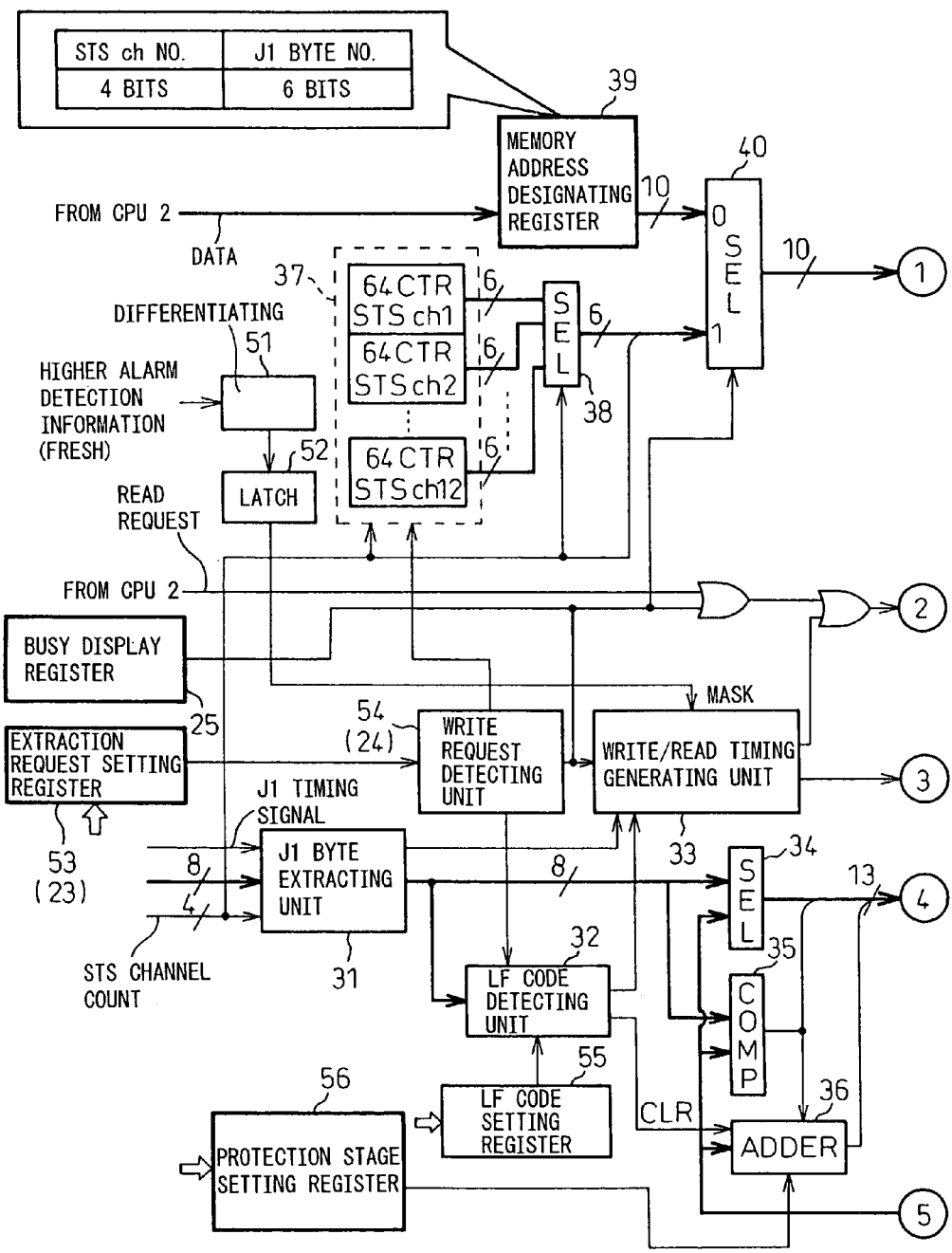
FIG. 14 is a view of the basic configuration of Example 5 according to the present invention (part 1)
Figure 15:
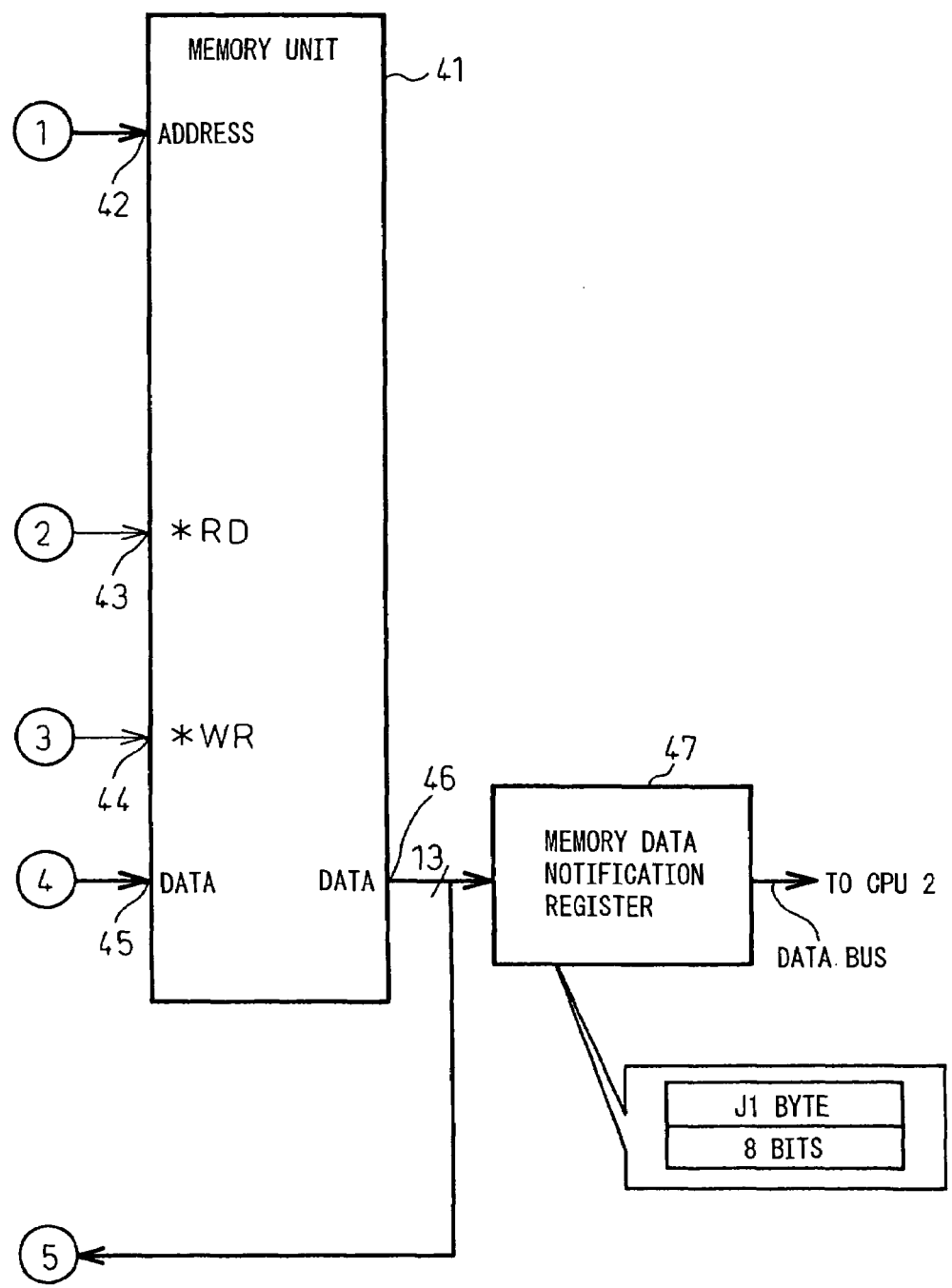
FIG. 15 is a view of the basic configuration of Example 5 according to the present invention (part 2)

FIG. 14 is part 1 of a view of the basic configuration of Example 5 according to the present invention, while FIG. 15 is part 2 of the same.

Example 5 shown in FIG. 14 and FIG. 15 is the same in the majority of its components as Example 4 shown in FIG. 10 and FIG. 11. Example 5 differs from Example 4 in the introduction of the above-mentioned higher alarm detection information (for example, see "higher alarm" of FIG. 7).

Along with this, a differentiation circuit 51 and latch circuit 52 are introduced, a busy display register 25 (see FIG. 5) is introduced, an extraction request setting register 53 (corresponding to extraction request register 23 of FIG. 5) is introduced, a write request detecting unit 54 (corresponding to extraction request detecting unit 24 of FIG. 5) is introduced, an LF code setting register 55 is introduced, and a protection stage number setting register 56 is introduced.

The components to be particularly noted among these are the extraction request setting register 53 and the protection stage number setting register 56.

The extraction request receiving means 15 (see FIG. 4) includes the extraction request setting register 53. The extraction request setting register 53 stores setting data of the sampling timing designated from the outside.

The received path trace detection apparatus is further provided with the protection stage number setting register 56 enabling the predetermined consecutive number of protection stages at the protecting means 13 (see FIG. 4) to be freely set from the outside.

These registers 53 and 56 will be explained further next.

When the input path signal SP has bit error, if the rate of the bit error is low, it is considered that the TIM-P can be normally detected under conditions where the sampling timing of the received STS path trace signal is 6 seconds and the consecutive number of times of mismatch with the expected values is "5". However, when there is a high rate of bit error, unless the signal is sampled more frequently than the above detection conditions, there is a possibility of erroneous detection of a TIM-P. Therefore, the TIM-P detection conditions, that is, the sampling timing of the received STS path trace signal and the consecutive number of times of mismatch with the expected values, are being studied by the GR-253-CORE (Telcordia Technologies, SONET Transport Systems: Common Generic Criteria) standards. Accordingly, the system is preferably configured to enable the sampling timing and number of protection stages to be easily changed.

In view of this situation, in the past, the practice had been for the continuity of the mismatches to be detected by the CPU 2, so the conventional detection apparatus (hardware) 1 was not aware of the number of protection stages and was configured to be able to flexibly deal with standards relating to TIM-P detection/release conditions.

However, with the method of monitoring the continuity of the received STS path trace signal sampled by the hardware (10) as in the present invention, the consecutive number of protection stages ends up being determined in advance and the standards relating to the TIM-P detection/release conditions cannot be flexibly dealt with.

Therefore, in Example 5, by adding some circuits like the setting registers 53 and 56 to the hardware (10), it becomes possible to flexibly deal with the standards relating to the TIM-P detection/release conditions.

That is, in a TIM-P detection method like in the present invention, by providing the setting register 56 of the consecutive number of protection stages in the hardware (10), it becomes possible to set the value of the number of mismatches or matches of the TIM-P detection/release conditions from the outside. If enabling the extract request timing to be set in the setting register 53 from the outside, it becomes possible to flexibly deal with the TIM-P detection/release conditions.

For example, if the CPU 2 sets "5" in the register 56 for setting the consecutive number of protection stages and issues an STS path trace signal extraction request at 6 second periods, it executes TIM-P detection by five samplings in a 30 second detection time.

Example 5 shown in FIG. 14 and FIG. 15 will be explained in further detail below.

The received path trace detection apparatus shown here realizes the monitoring of the continuity of the path trace signal and the notification of the path trace signal to the CPU 2 by serial processing using the RAM (41) for the STS-12 signal (STS-1×12).

The memory unit 41 of the received path trace signal stores the received path trace signal extracted from the input STS path signal Sp. The write/read timing generating unit 33 generates write and read enable signals to the memory unit 41.

The 64 counter 37 for every STS path recognizes, in STS path units, which byte of data of the path trace signal the write data is so as to generate a memory address (42) when writing a path trace signal in J1 byte units in the memory unit 41.

The CPU 2 sets "1" in the extraction request setting register (write request register) 53 of the path information for every sampling timing only for STS channels in which the TIM-P function is set active by user settings. On the other hand, the hardware (10) starts the search of the LF code from the received J1 bytes at the LF code detecting unit 32 when triggered by the write request, notifies the busy state to the CPU 2 (25), and masks the access from the CPU 2 to the memory unit 41 in a hardware like manner. This LF code can be set from the μ-COM. The default value is made "$OA_H$". The LF code detecting unit 32 detects the LF code (same value as above μ-COM setting), then decides that the J1 byte of the next frame is a lead byte of the STS path trace signal. The comparator 35 compares the extracted J1 byte (for example 1st byte of STS-1 ch#1) with the corresponding J1 byte read from the RAM (41) (for example 1st byte of STS-1 ch#1). When the result of comparison is "mismatch", it updates the data of the RAM (41) (corresponding J1 byte (for example, 1st byte of STS-1 ch#1)), designates the next J1 byte address at the next clock (for example, the address of the 2nd byte of the STS-1 ch#1), and writes "mismatch" in the COMP bit. Further, even when the result of comparison at the comparator 35 is that a "match" is detected, when the COM bit at the same address as the compared J1 byte indicates a "mismatch", since this shows that a mismatch was detected at the previous J1 byte, the address of the next J1 byte is designated and "mismatch" is written in the COMP bit. By doing this, the results of mismatches of the J1 bytes are transmitted up to the 64th byte. Only when the results of comparison of all 64 bytes are a "match" in the comparison of the 64th byte of the J1 byte, the adder 36 adds "1" to the previous protection stage number code read out from the address of the 64th byte of the RAM (41) and writes the new value again in the RAM (41).

Further, when the search for the LF code at the LF code detecting unit 32 fails to detect any LF code even when searching through 64 received J1 bytes (that is, 64 STS frames worth), it treats this as a mismatch by clearing the protection stage number code of the address of the 64th byte of the RAM (41) (for example, forcibly writes "0" in the protection stage number bit) and restarts new monitoring of the continuity from the next sampling timing.

In this way, the hardware 10 monitors for continuity of the STS path trace signal. When detecting continuity for the number of protection stages set in the protection stage number setting register 41, it notifies the CPU 2 of release of the busy state and enables the CPU 2 to read out the data stored in the memory unit 41. The CPU 2 confirms that the busy state is released, then starts the read access to the memory unit 41. This read operation of the received path trace signal is performed to the memory unit 41 using the memory address designation register 39 and memory data notification register 47.

As processing when a higher alarm of the same STS channel is detected, first, when a higher alarm is detected even for an instant during the search of the LF code and that alarm is released within 64 units worth of search time and then the LC code is again detected, the next 64 bytes' worth of J1 bytes are processed as the effective path trace signal. However, when a higher alarm is detected during the search of the LF code, but that alarm is not released with the search time or if no LF code is detected after releasing the alarm, that sampling is judged as invalid and the entire processing is ended.

Further, when at the timing position of the J1 byte after detection of an LF code and a state of detection of a higher alarm, the hardware 10 is triggered by this and latches the alarm state up to the J1 position of the 64th byte and thereby masks the generation of the write/read timing. This masking is performed for the write/read timing generating unit 33 by the differentiation circuit 51 for obtaining a grasp of the generation of the higher alarm detection information and latch circuit 52 for latching the differentiated output. By doing this, if detecting a higher alarm at J1 byte positions forming a path trace signal even for an instant, the updating of the data in the RAM (41) is prohibited and no effect is given to the stored number of protection stages.

In the example explained above, the path signal Sp is an STS path layer signal, and the specific bytes are J1 bytes mapped in the STS path layer signal.

However, the invention is not limited to this. The path signal Sp may also be a VT path layer signal. In this case, the specific bytes are J2 bytes mapped in the VT path layer signal. In this case, by applying the techniques of Examples 1 to 5 to the VT path trace signal (J2 bytes) and forwarding the received VT path trace signal (J2 bytes) after consecutive protection to the CPU 2, it becomes possible to realize a TIM-V detection function by the addition of small sized circuits and the minimum CPU processing load.

In particular, in a VT PTE with a large number of processing channels, lightening the processing load of the CPU 2 or enabling serial processing by the RAM (41) configuration is extremely effective for reducing the size of the apparatus (10) and lowering the power consumption.

Explaining this in more detail, at the present time, regarding a "TIM defect" and "TIM failure", only the STS path alarm, that is, the TIM-P, is defined in the GR-253-CORE (Telcordia Technologies, SONET Transport Systems: Common Generic Criteria) standard. TIM-V is not defined. However, the fact that it will be necessary to define the TIM-V as a VT path alarm in the future has been noted.

In view of this situation, an ADM which terminates a VT path and deals with the TIM-V (VT path trace identifier mismatch) detection function suffers from problems the same as the above problems faced by ADMs dealing with the TIM-P detection function.

In particular, a STS-1 signal has 28 channels of VT 1.5 signals mapped in it. For example, in an ADM processing 2.4G capacity SONET signal, the biggest number of channels in STS path trace detection processing in the case of operation as an STE PTE is 48 channels. As opposed to this, the largest number of channels in VT path trace detection processing in the case of operation as a VT PTE is 48×28=1344. From this as well, it is clear that the VT path trace detection processing imposes a much larger processing load on the CPU 2 than STS path trace detection processing.

To solve this problem, by applying the techniques explained in Examples 1 to 5 to a VT path trace signal (J2 bytes) and forwarding the received VT path trace signal (J2 bytes) after consecutive protection to the CPU 2, it is possible to realize the TIM-P detection function by an efficient circuit configuration and the minimum CPU processing load.

The final Example 6 of the present invention relates to the technique for further improving the reliability of the ADM.

Figure 16:
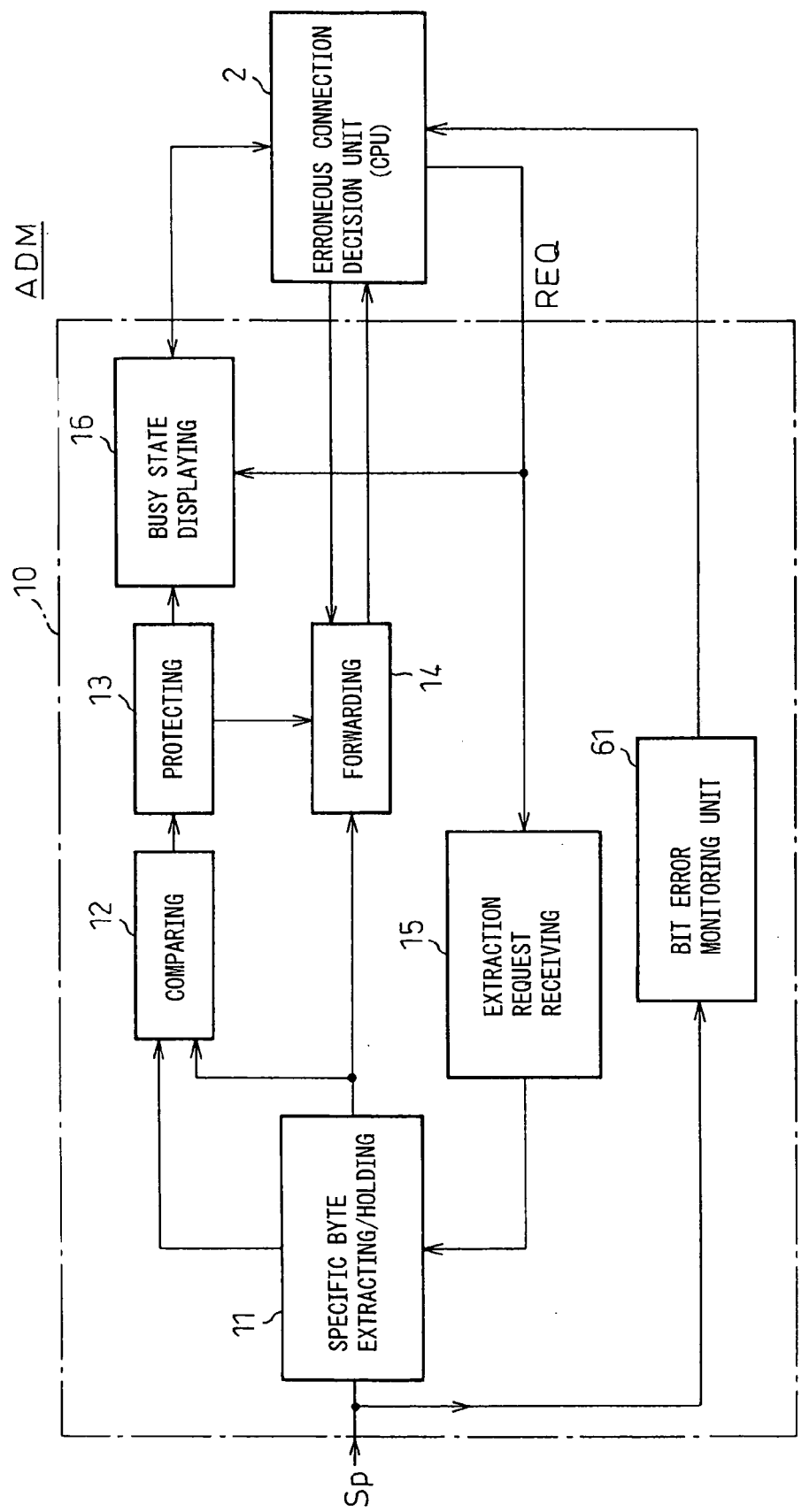
FIG. 16 is a view of an outline of Example 6 according to the present invention.

FIG. 16 is a view of an outline of Example 6 according to the present invention. This shows an example of a case based on the configuration of FIG. 4.

That is, this shows a received path trace detection apparatus further provided with a bit error monitoring unit 61 for monitoring for bit error included in the path signal Sp. The results of monitoring by the bit error monitoring unit 61 may be utilized for further improving the accuracy of decision of the erroneous connection decision unit (CPU) 2.

First, a conventional bit error monitoring unit will be explained.

Figure 17:
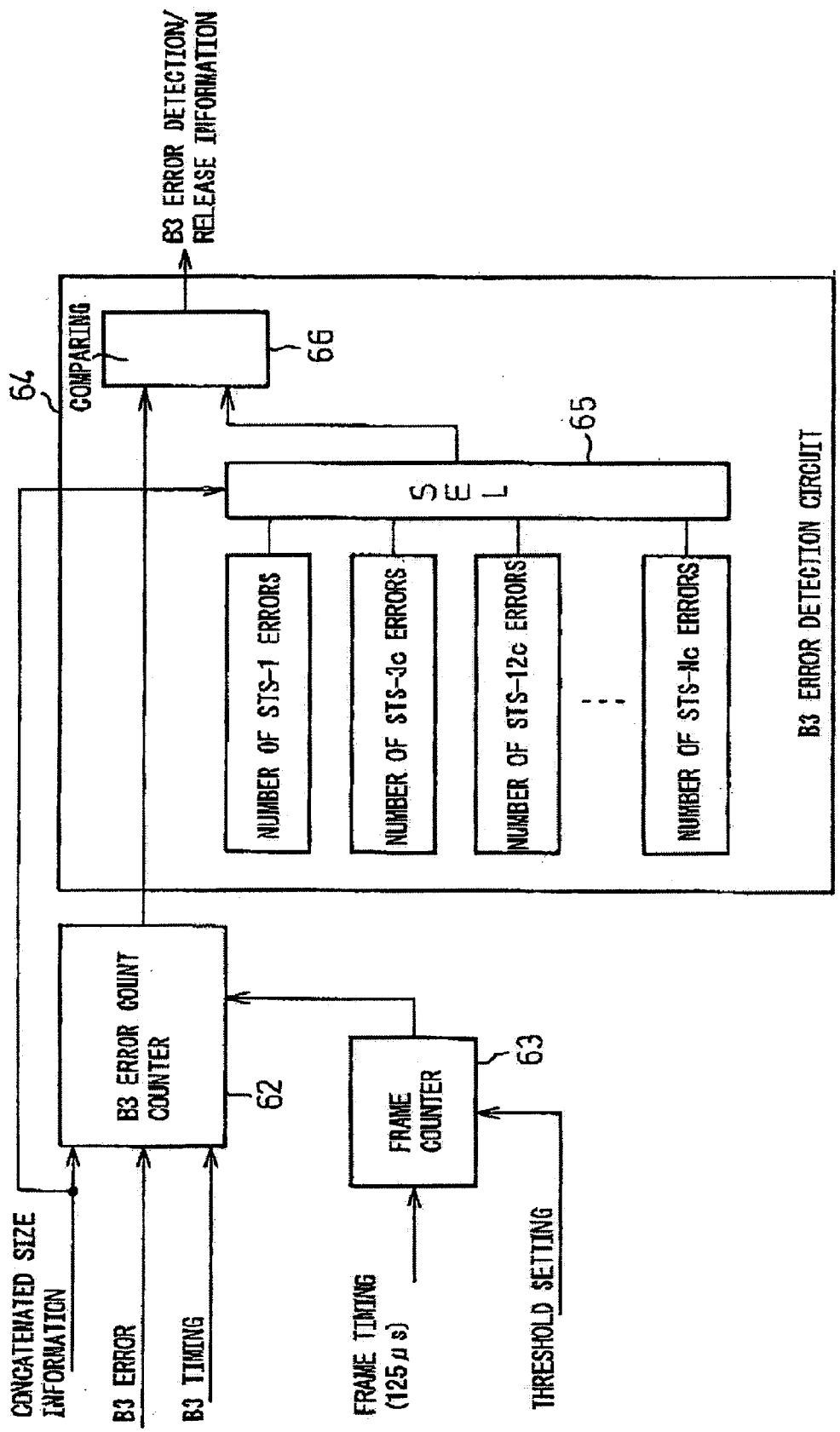
FIG. 17 is a view of an example of a conventional bit error monitoring unit.
Figure 18:
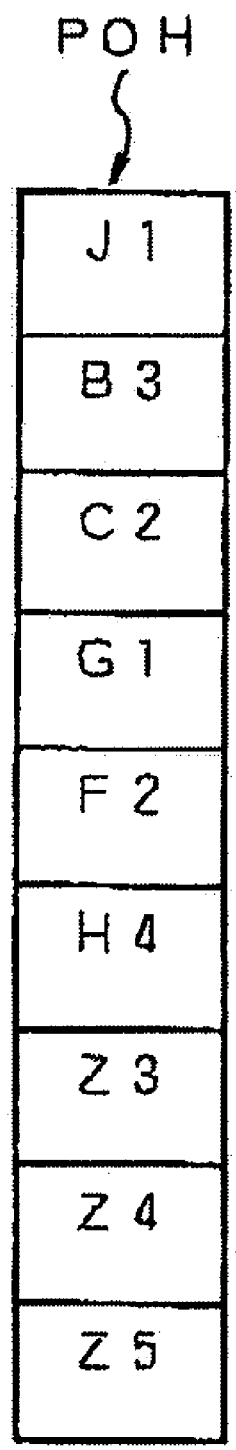
FIG. 18 is a view of known general path overhead.

FIG. 17 is a view of an example of a conventional bit error monitoring unit, while FIG. 18 is a view of known general path overhead.

FIG. 18 shows the data format of the path overhead POH. Nine types of control bytes illustrated are defined. Among these, the above-mentioned J1 byte (trace byte) is shown as the 1st byte. Further, the second byte is the B3 byte (bit error byte). The B3 byte relates to the monitoring of bit error explained below.

The prior art will be explained while referring to FIG. 17. The three conditions corresponding to the B3 error detection release conditions, that is, the error detection/release monitoring time, the threshold value of the number of detection/release error bits, and the number of detection/release protection stages must be determined so as to satisfy the maximum value of the detection/release time, the minimum value of the detection/release probability, and the maximum value of the erroneous detection (and release) probability. To reduce the size of the B3 error detection circuit 64 of FIG. 17, it is wise to set these three conditions to extremely small values. Here, the "detection time" is the actual time from when the state of bit error is entered to when an alarm is issued. Further, the "release time" is the actual time from when the state of bit error is released to when the alarm is cancelled. Normally, the detection time and the release time are set equal (regarding this time, see the GR standard of FIG. 21 explained later).

With this as the background, in the past, ADMs detecting B3 error linked with various types of concatenated sizes made the monitoring period of the B3 error detection/release frame the same value regardless of the concatenated size of the data monitored or made it the same value as the monitoring period of the frame with the highest error rate able to be detected for every concatenated size (see selector 65 of FIG. 17). The reason is that with a high error rate where the maximum number of errors "8" of a frame by the B3 error count counter 62 after BIP-8 processing would be greatly exceeded, the error cannot be accurately detected (by comparator 66), so a maximum error rate detectable for each concatenated size is provided.

If making the B3 error detection/release frame monitoring period of the error rate the same value for all concatenated sizes regardless of the concatenated size of the data covered, the monitoring times of all of the other STN-Nc will be matched with the monitoring time of the STS-1 signal requiring the longest monitoring time for detection/release. Due to this long monitoring time, the larger the concatenated size of the monitored data, the more unnecessarily larger the number of detection/release error bits (see number of STS-1 errors to number of STS-Nc errors of FIG. 17). Therefore, the configuration ends up becoming inefficient—with the circuit size of the error count counter 62 being increased or the circuit 64 becoming complicated due to the difference in the number of detection/release error bits for each concatenated size.

Figure 19:
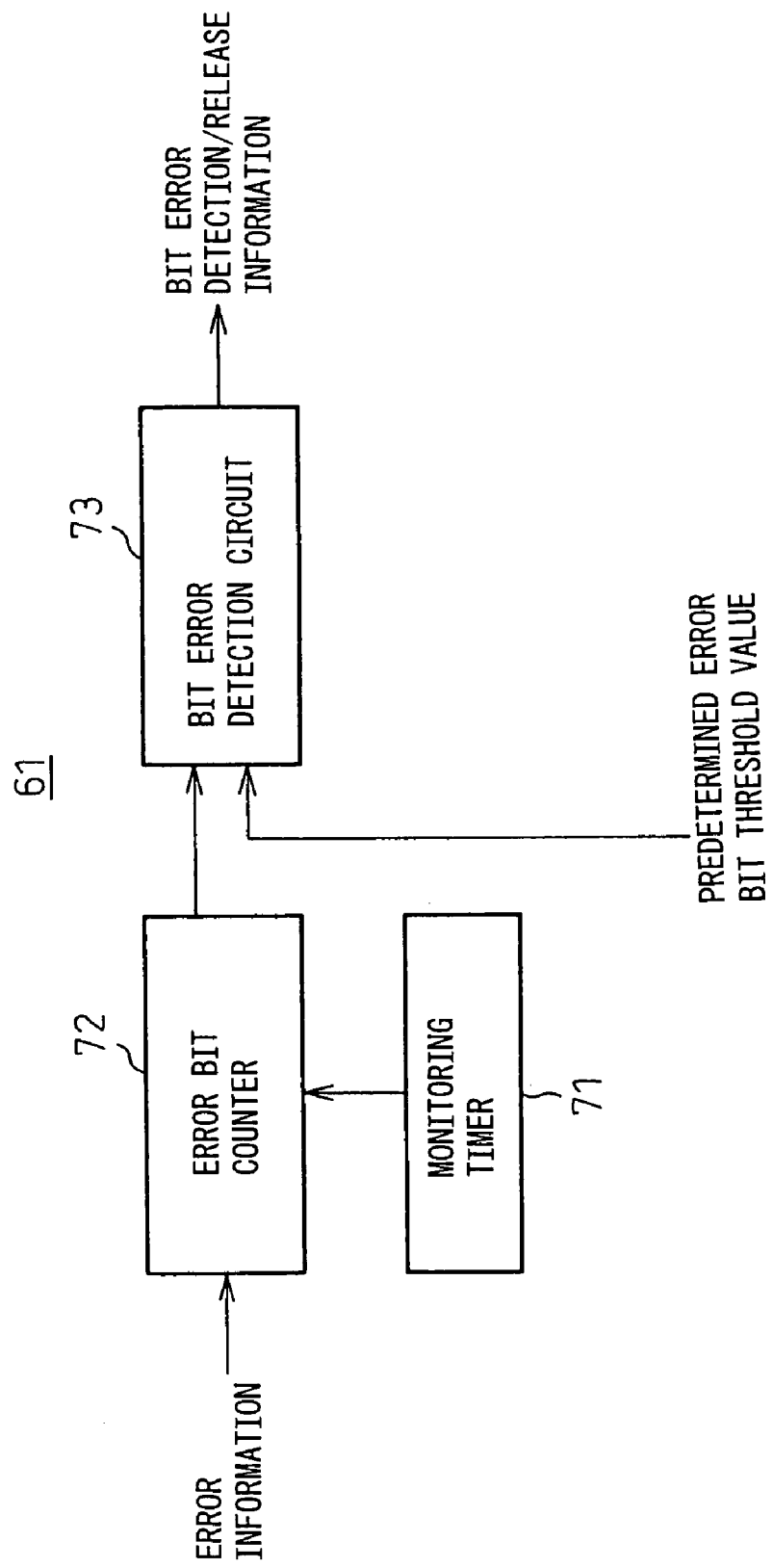
FIG. 19 is a view is a view of the basic configuration of a bit error monitoring unit according to Example 6.

FIG. 19 is a view of the basic configuration of a bit error monitoring unit according to Example 6.

As shown in the figure, the bit error monitoring unit 61 is comprised of a monitoring timer 71, an error bit counter 72, and a bit error detection circuit 73.

The monitoring timer 71 is for setting a timing of monitoring for bit error, the error bit counter 72 is for counting the number of occurrences of error bits by the monitoring timing set by the monitoring timer 71, and the bit error detection circuit 73 is for comparing the magnitude of the number of bit errors output from the error bit counter 72 with a predetermined error bit threshold value and generating bit error detection/release information in accordance with the results of the comparison.

Example 6 makes the B3 error detection/release frame monitoring period a value inversely proportional to the number of bits of the STS-Nc SPE (synchronous payload envelop)

in one frame and makes the number of detection/release error bits of the B3 error (threshold value) the same value without regard as to the concatenated size. Due to this, it is possible to streamline the detection circuit 86 and keep the number of error bits to a small value. Due to this the circuit size of the B3 error count counter 62 is slashed and a smaller size of the apparatus is realized.

That is, this provides an ADM which monitors the STS path and detects the STS path BERs (bit error rate) corresponding to various concatenated sizes which shortens the B3 error detection/release frame monitoring period the larger the concatenated size of the STS path signal monitored for error and makes the threshold of number of the B3 error detection/release error bits a uniform small value without regard as to the concatenated size. Due to this, it is possible to slash the circuit size of the counter 62 for counting the number of errors.

Figure 20:
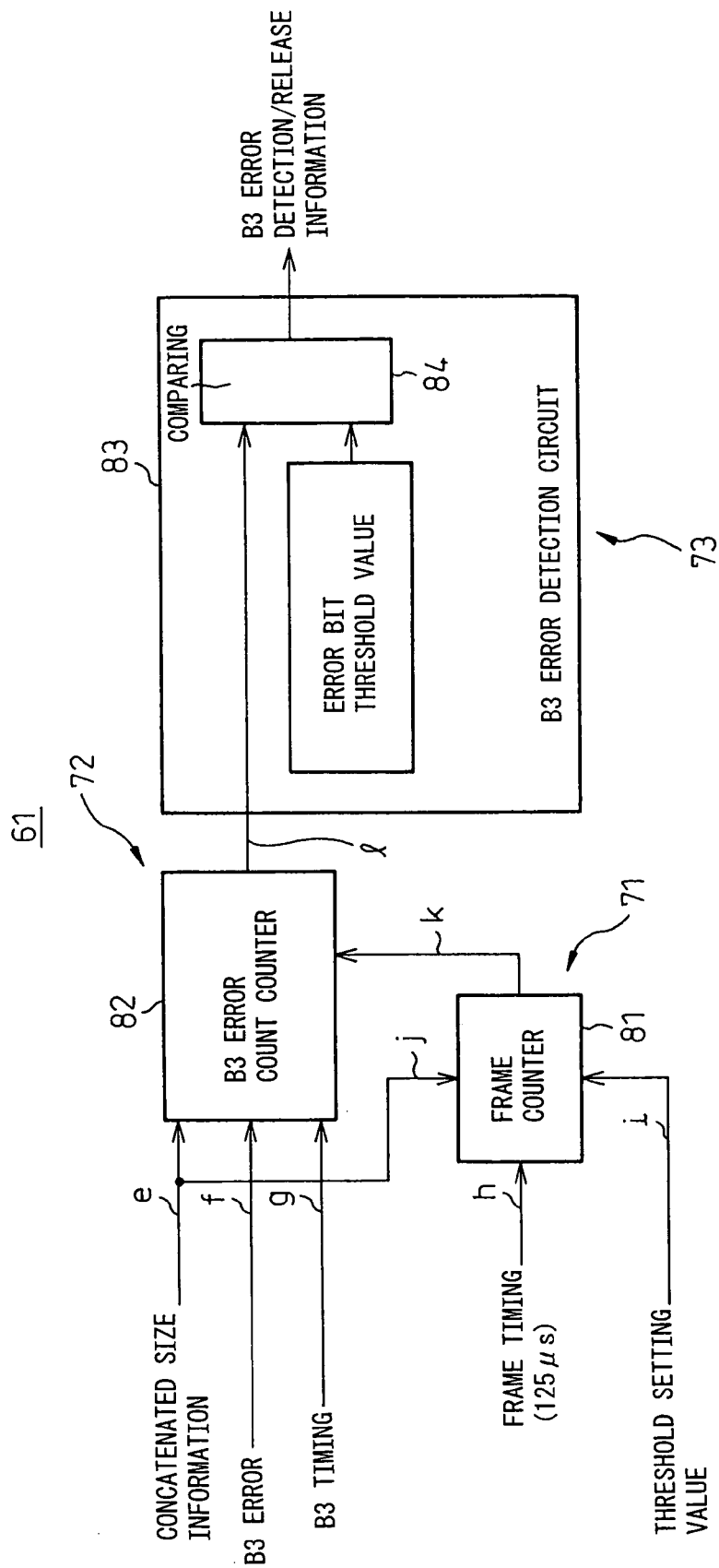
FIG. 20 is a view is a view of a specific example of the basic configuration of FIG. 19.

FIG. 20 is a view is a view of a specific example of the basic configuration of FIG. 19.

In the figure, the frame counter 71 counts the 125 μs frame timing (h) to generate the B3 minor (MIN) error detection/release monitoring timing (k). The maximum value of the detection/release time is defined for every threshold. The detection/release time of the STS-1 signals is determined to satisfy this. This becomes the maximum value of the frame counter 81. The detection/release time of the STS-Nc signals is set as 1/N of the detection/release time of the STS-1 signals and is controlled in a direction to reduce the count of the frame counter 81 in accordance with the concatenated size information of the STS path signal. Further, in the counter 81, the number of monitored frames of the STS signal (STS-1, STS-3c, STS-12c . . . ) is controlled to be inversely proportional to the threshold setting (i). Here, the B3 MIN detection/release times are shown in the table.

Figure 21:
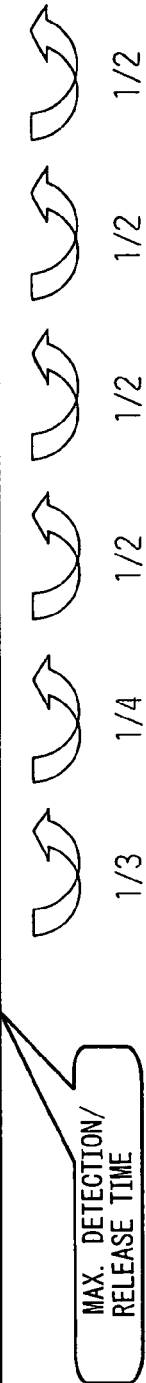
FIG. 21 is a table showing a B3 minor (MIN) detection/release time.

FIG. 21 is a table showing the B3 minor (MIN) detection/release time.

The above threshold setting is shown as "threshold" at the left end of the table.

Explaining FIG. 20 while referring to FIG. 21, the B3 error count counter 82 increments the number of the B3 errors (f) for each frame input at the timing of the B3 bytes (g) by exactly the detection/release timer time (k) input from the frame counter 81 and transmits that count (l) to the B3 error detection circuit 83.

Further, the concatenated size information of the STS path signal (e) is utilized for recognizing the effective B3 timing position changing with every concatenated size.

In the B3 error detection circuit 83, the comparator 84 compares the number of errors (l) generated in the monitoring period (30 ms, 300 ms . . . in FIG. 21) and the error bit threshold (TH) value (m) and decides detection/release. The threshold value m of the number of errors is set independently for detection and release so as to satisfy the probability of detection/release/erroneous detection/erroneous release set by the standards. It is made a common value without regard as to the concatenated size and the threshold. Here, the number of B3 MIN detection/release error bits is shown in the table.

FIG. 22 is a table showing the number of error bits at B3 minor (MIN) detection/release.

In Example 6, by making the B3 MIN error detection/release frame monitoring period ((k) of FIG. 20) a value inversely proportional to the number of bits of STS-Nc SPE in one frame (column of "Example 6 of Present Invention" in FIG. 21), it is possible to keep the number of B3 MIN error detection/release error bits a small value. As a result, it becomes possible to slash the circuit size of the error count counter 82. Further, since the threshold value of the number of error bits becomes the same value regardless of the concatenated size, the B3 MIN error detection circuit 83 is streamlined and the circuit size can be reduced.

Summarizing Example 6, it consists of FIG. 19 (basic configuration of Example 6) which changes the length of the monitoring timing set by the monitoring timer 71 in accordance with the classification (STS-1 to STS-192c) of the type of the frame of the path signals and sets the error bit threshold value in the bit error detection circuit 73 to a common constant value regardless of the classification of the type of the frame.

Finally, the technique for further improving the reliability of the bit error monitoring unit 61 according to Example 6 will be explained.

When detecting the B3 error in the past, the threshold value of the number of detected error bits of the B3 error was decided without considering the drop in the detection probability due to the BIP (bit interleaved parity)-8 processing. Therefore, when the line error rate was high, sometimes the detection probability did not satisfy the standard and there was a problem in the reliability.

The reason why the detection probability ends up falling due to the BIP-8 parity processing in this way is as follows:

When 2 or more bits of error occur in one frame, there is a possibility of 2 or more bits of error occurring in the same bit string after 8-parallel development. If an even number of errors occur in the same bit string after 8-parallel development, that error will end up being cancelled out, so will not be detected. Therefore, when 2 or more bits of error occur in one frame, there is a possibility of the number of error bits detected becoming smaller than the number of error bits of the actual line.

The conventional formula for calculation of the detection probability is as follows:

$$10^{-x} \text{ detection probability (probability of there being at least } N$$

$$\text{number of errors in } 10^{-x} \text{ times)} = \left(1 - e^{-R}\sum_{i=0}^{N-1}(R^i/i!)\right)^M$$

Here, R is the average number of errors per monitored superframe and M is the number of protection stages of detection.

In the same way, when detecting BIP-2 error in the past, the threshold value of the number of detected error bits of the BIP-2 error was decided without considering the drop in the detection probability due to BIP-2 processing. Therefore, when the line error rate was high, sometimes the detection probability did not satisfy the standards and there was a problem in the reliability.

The reason why the detection probability ends up falling due to the BIP-2 parity processing in this way is as follows:

When 2 or more bits of error occur in one superframe, there is a possibility of 2 or more bits of error occurring in the odd number bit string or even number bit string after 8-parallel development. If an odd number of errors occur in the odd number bit string or even number bit string after 8-parallel development, that error will end up being cancelled, so will not be detected. Therefore, when 2 or more bits of error occur in one superframe, there is a possibility of the number of error bits detected becoming smaller than the number of error bits of the actual line.

The conventional formula for calculation of the detection probability is as follows:

$$10^{-x} \text{ detection probability (probability of there being at least } N$$
$$\text{number of errors in } 10^{-x} \text{ times}) = \left(1 - e^{-R}\sum_{i=0}^{N-1}(R^i/i!)\right)^M \quad 5$$

where, R is the mean number of errors per monitored superframe, while M is the number of protection stages of detection.

Example 6 improves the reliability of the detection probability by determining the threshold value of the number of detected error bits considering the drop in the detection probability due to BIP-8 processing.

In the same way, Example 6 improves the reliability of the detection probability by determining the threshold value of the number of detected error bits considering the drop in the detection probability due to BIP-2 processing.

Specifically, in Example 6, when determining the predetermined error bit threshold value, the apparatus introduces a specific calculation formula (A, B) for calculating the bit error detection probability and determines the bit error threshold value so that the bit error detection probability calculated by the calculation formula (A, B) satisfies a standard bit error detection probability.

Below, detailed examples will be explained.

<1>In a first aspect of Example 6, the B3 error detection probability is calculated by the following calculation formula A considering the drop in the number of error bits due to BIP-8 parity processing and the number of error bits is determined so as to satisfy the standard (latest GR at least 99%).

Calculation formula A of detection probability of first aspect:

$$10^{-x} \text{ detection probability ("threshold" of left end of FIG. 21)} \quad (A)$$
$$\text{considering } BIP\text{-}8 \text{ (probability of there being}$$
$$\text{at least } N \text{ number of errrors in } 10^{-x} \text{ times}) =$$
$$\left(1 - e^{-R}\left\{\sum_{i=0}^{N-1}(R^i/i!) + \sum_{i=N}^{\infty}((R^i/i!)xP_i)\right\}\right)^M$$

where, R=average number of errors per monitored superframe

M=number of protection stages of detection $P_i$=probability of number of detected error bits becoming less than N at time of i number of line errors Therefore, the higher the line error rate, the larger the $P_i$, so the detection probability found becomes smaller.

Calculation Example 1) In case of STS-1, bit error rate $10^{-4}$, number of monitored frames 120, number of detected error bits 53, number of protection stages of detection 2, $10^{-4}$ average number of errors R=6264×120×$10^{-4}$=75.168 a) With the conventional calculation formula, $$\text{detection probability } Pa = \left(1 - (e^{-R} \times (1 + R + R^2/2! + \ldots + R^{52}/52!))\right)^2$$
$$= 0.994 \geq 0.99$$

b) With the calculation formula of the first aspect, $$\text{detection probability } Pb = (1 - [e^{-R} \times \{1 + R + R^2/2! + \ldots +$$

-continued
$$R^{52}/52! + (R^{53}/53!) \times 0.78 +$$
$$(R^{54}/54!) \times 0.79 + (R^{55}/55!) \times 0.46 +$$
$$(R^{56}/56!) \times 0.47 + (R^{57}/57!) \times 0.22 +$$
$$(R^{58}/58!) \times 0.22 + \ldots \}])^2$$
$$= 0.978 < 0.99$$

As a result, even if considering BIP-8, with a number of detected error bits of 53, the standard of detection probability is not satisfied.

Calculation Example 2) In case of STS-1, bit error rate $10^{-4}$, number of monitored frames 120, number of detected error bits 50, number of protection stages of detection 2, a) With the conventional calculation formula, $$\text{detection probability } Pa = \left(1 - (e^{-R} \times (1 + R + R^2/2! + \ldots + R^{49}/49!))\right)^2$$
$$= 0.998 \geq 0.99$$

b) With the calculation formula A of the present invention, $$\text{detection probability } Pb = (1 - [e^{-R} \times \{1 + R + R^2/2! + \ldots +$$
$$R^{49}/49! + (R^{50}/50!) \times 0.727 +$$
$$(R^{51}/51!) \times 0.741 + (R^{52}/52!) \times 0.39 +$$
$$(R^{53}/53!) \times 0.41 + \ldots \}])^2$$
$$= 0.995 \geq 0.99$$

As a result, even if considering BIP-8, with a number of detected error bits of 50, the standard of detection probability is satisfied.

By considering the drop in the detection probability due to the BIP-8 processing in this way and then employing detection conditions satisfying the standard of detection probability, it becomes possible to improve the reliability of the detection of faults.

<2>In a second aspect of Example 6, the BIP-2 error detection probability is calculated by the following calculation formula B considering the drop in the number of error bits due to BIP-3 parity processing and the number of error bits is determined so as to satisfy the standard (latest GR at least 99%).

Calculation formula B of detection probability of second aspect:

$$10^{-x} \text{ detection probability} \quad (B)$$
$$\text{considering } BIP\text{-}2 \text{ (probability of there being}$$
$$\text{at least } N \text{ number of errors in } 10^{-x} \text{ times}) =$$
$$\left[1 - e^{-R}\left\{\sum_{i=0}^{N-1}(R^i/i!) + \sum_{i=N}^{\infty}((R^i/i!) \times P_i)\right\}\right]^M$$

where, R=average number of errors per monitored super frame

M=number of protection stages of detection $P_i$=probability of number of detected error bits becoming less than N at time of i number of line errors Therefore, the higher the line error rate, the larger the $P_i$, so the detection probability found becomes smaller.

Calculation Example 1) In case of VT 1.5, bit error rate $10^{-4}$, number of monitored frames 400, number of detected error bits 20, number of protection stages of detection 2, $10^{-4}$ average number of errors R=864×400×$10^{-4}$=34.56 a) With the conventional calculation formula, detection probability $Pa = (1 - (e^{-R} \times (1 + R + R^2/2! + ... + R^{19}/19!))^2$ $= 0.994 \geq 0.99$ b) With the calculation formula B of the second aspect, detection probability $Pb = (1 - [e^{-R} \times \{1 + R + R^2/2! + ... +$ $R^{19}/19! + (R^{20}/20!) \times 0.213 +$ $(R^{21}/21!) \times 0.232 + (R^{22}/22!) \times 0.029 +$ $(R^{23}/23!) \times 0.035 + (R^{24}/24!) \times 0.003 +$ $(R^{25}/25!) \times 0.004 + ... \}])^2$ $= 0.990 \geq 0.99$ As a result, even if considering BIP-2, with a number of detected error bits of 20, the standard of detection probability is satisfied.

By considering the drop in the detection probability due to BIP-2 processing in this way and then employing detection conditions satisfying the standard of detection probability, it becomes possible to improve the reliability of the detection of faults.

From the above, by having an ADM monitoring an STS path and detecting the STS path BER (bit error rate) consider the drop in the detection probability due to the BIP-8 processing in determining the threshold value of the number of detected error bits of B3 error, it is possible to improve the reliability of detection probability of B3 error.

In the same way, by having an ADM monitoring a VT path and detecting the VT path BER (bit error rate) consider the drop in the detection probability due to the BIP-2 processing in determining the threshold value of the number of detected error bits of BIP-2 error, it is possible to improve the reliability of detection probability of BIP-2 error.

As explained above, according to the present invention, in detection of a TIM alarm on the STS/VT path layer, detection of the TIM alarm at the CPU 2 is realized by extracting the received path trace signal in accordance with the request from the CPU 2, monitoring for continuity of the path trace signal considering the state of detection of a higher alarm, and forwarding the path trace signal to the CPU 2 only when it continues for the number of protection stages. Due to this, by just adding small sized circuits (comparator 35 and adder 36) to a conventional circuit, it becomes possible to greatly lighten the processing load of the CPU 2 and possible to easily design a system flexibly meeting the standard.

Further, in an ADM detecting the BER of the STS/VT path, it becomes possible to reduce the size of the counter 62. Further, by improving the method of calculation of the threshold value of the number of detected bit errors (calculation formulas A and B), it becomes possible to improve the reliability of detection probability of B3 error and BIP-2 error. Due to this, it becomes possible to reduce the size of the apparatus as a whole and becomes possible to provide a high reliability, stable apparatus.

Summarizing the above, it is possible to provide an ADM for processing the STS and VT path layers which lightens the processing load of the CPU 2, streamlines the circuits, and improves the reliability.

The invention claimed is:

1. A received path trace detection apparatus provided with:
   a specific byte extracting/holding function unit receiving a path signal sent from another apparatus and extracting and holding once path information written for showing the path in specific bytes mapped in the received path signal at a predetermined sampling timing,
   a comparing function unit detecting if path information of previous specific bytes held in the specific byte extracting/holding function unit and path information of the currently received specific bytes match,
   a protecting function unit detecting that said match has continued for exactly a predetermined number of protection stages as a result of the comparison by said comparing function unit, and
   a forwarding function unit forwarding the held path information to an erroneous connection decision unit for enabling the erroneous connection decision unit to decide if values exhibited by path information of the specific bytes held at said specific byte extracting/holding function unit and predetermined expected values match when matches of a consecutive number of protection stages are detected by said protecting function unit.

2. A received path trace detection apparatus as set forth in claim 1, wherein
   said apparatus is further provided with:
   an extraction request receiving function unit receiving an extraction request for starting up said specific byte extracting/holding function unit from said erroneous connection decision unit at said sampling timing and
   a busy state displaying function unit set and displaying a busy state when said extraction request receiving function unit receives said extraction request and reset and releasing said busy state when said protecting function unit detects matches of said consecutive number of protection stages, and
   said erroneous connection decision unit confirms that said busy state displaying function unit has been reset and reads path information of said specific bytes from said forwarding function unit.

3. A received path trace detection apparatus as set forth in claim 2, wherein said erroneous connection decision unit predicts in advance the time required for detecting matches of said consecutive number of protection stages and confirms that said busy state displaying function unit has been reset at the predicted timing.

4. A received path trace detection apparatus as set forth in claim 1, which supplies alarm information to said protecting function unit when a higher alarm has been detected, invalidates the results of detection of whether or not the path information of said specific bytes match as input from said comparing function unit to said protecting function unit, and holds as is said number of protection stages accumulated up to then.

5. A received path trace detection apparatus as set forth in claim 1, which supplies alarm information to said specific byte extracting/holding function unit when a higher alarm has been detected and holds as is, without updating, the path information of said specific bytes held at said specific byte extracting/holding function unit.

6. A received path trace detection apparatus as set forth in claim 1, which realizes a holding function of said specific byte extracting/holding function unit and a forwarding function of said forwarding function unit by a readable/writeable memory unit.

7. A received path trace detection apparatus as set forth in claim 6, which realizes an extraction function of said specific byte extracting/holding function unit by a specific byte extracting unit and inputs path information of said specific bytes extracted by said specific byte extracting unit to a data write port of said memory unit.

8. A received path trace detection apparatus as set forth in claim 7, which
configures said comparing function unit by a comparator and
reads out path information of said specific bytes extracted the previous time and written in said memory unit by said specific byte extracting unit from said memory unit and compares this at said comparator with path information of said specific bytes extracted the current time from said specific byte extracting unit.

9. A received path trace detection apparatus as set forth in claim 6, wherein said memory unit
has a write enable port and a read enable port for enabling writing of path information of said specific bytes to said memory unit and reading of path information of said specific bytes from said memory unit and
is provided with a write/read timing generating unit for supplying a write enable signal and read enable signal to said write enable port and read enable port.

10. A received path trace detection apparatus as set forth in claim 8, which
configures said protecting function unit by an adder and
reads out said consecutive number of protection stages written in said memory unit and increments said consecutive number of protection stages by said adder based on output of said comparator and again writes the incremented consecutive number of protection stages in said memory unit.

11. A received path trace detection apparatus as set forth in claim 6, wherein said memory unit has an address input port for designating an address of data to be written from a data input port of said memory unit and an address of data to be read out from said memory unit to said erroneous connection decision unit.

12. A received path trace detection apparatus as set forth in claim 2, wherein said extraction request receiving function unit includes an extraction request setting register and said extraction request setting register stores setting data of said sampling timing designated from the outside.

13. A received path trace detection apparatus as set forth in claim 8, further provided with a protection stage number setting register enabling said predetermined consecutive number of protection stages at said protecting function unit to be freely set from the outside.

14. A received path trace detection apparatus as set forth in claim 8, wherein said path signal is a STS path layer signal and said specific bytes are J1 bytes mapped in said STS path layer signal.

15. A received path trace detection apparatus as set forth in claim 1, wherein said path signal is a VT path layer signal and said specific bytes are J2 bytes mapped in said VT path layer signal.

16. A received path trace detection apparatus as set forth in claim 1, further provided with a bit error monitoring unit for monitoring for bit error included in said path signal.

17. A received path trace detection apparatus as set forth in claim 16, wherein said bit error monitoring unit is provided with:
a monitoring timer for setting a timing of monitoring for bit error,
an error bit counter for counting the number of occurrences of error bits by said monitoring timing set by said monitoring timer, and
a bit error detection circuit for comparing the magnitude of the number of bit errors output from said error bit counter with a predetermined error bit threshold value and generating bit error detection/release information in accordance with the results of the comparison.

18. A received path trace detection apparatus as set forth in claim 17, which changes the length of said monitoring timing set by said monitoring timer in accordance with the classification of the type of the frame of said path signal and sets said error bit threshold value in said bit error detection circuit to a common constant value regardless of the classification of the type of said frame.

19. A received path trace detection apparatus as set forth in claim 17, which, when determining said predetermined error bit threshold value, introduces a specific calculation formula for calculating the bit error detection probability and determines said bit error threshold value so that said bit error detection probability calculated by said calculation formula satisfies a standard bit error detection probability.

* * * * *